United States Patent
Numata et al.

(10) Patent No.: US 9,998,040 B2
(45) Date of Patent: Jun. 12, 2018

(54) MOTOR DRIVER OF MOTOR FOR VALVE TIMING CONTROL OF INTERNAL COMBUSTION ENGINE

(71) Applicant: DENSO CORPORATION, Kariya, Aichi-pref. (JP)

(72) Inventors: Tatsuhiro Numata, Kariya (JP); Masatake Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 80 days.

(21) Appl. No.: 15/169,907

(22) Filed: Jun. 1, 2016

(65) Prior Publication Data
US 2016/0359434 A1    Dec. 8, 2016

(30) Foreign Application Priority Data

Jun. 5, 2015    (JP) .................................. 2015-114799
Nov. 27, 2015  (JP) .................................. 2015-231736

(51) Int. Cl.
| | |
|---|---|
| *F01L 1/344* | (2006.01) |
| *H02P 6/08* | (2016.01) |
| *H02P 27/08* | (2006.01) |
| *H02P 6/14* | (2016.01) |
| *F01L 13/00* | (2006.01) |

(Continued)

(52) U.S. Cl.
CPC ................. *H02P 6/08* (2013.01); *F01L 1/344* (2013.01); *H02P 6/14* (2013.01); *H02P 27/08* (2013.01); *F01L 3/20* (2013.01); *F01L 2001/0537* (2013.01); *F01L 2013/103* (2013.01); *F01L 2201/00* (2013.01); *F01L 2250/02* (2013.01); *F01L 2800/00* (2013.01); *F01L 2820/032* (2013.01); *F01L 2820/041* (2013.01); *F01L 2820/042* (2013.01); *F02D 2041/001* (2013.01); *F02D 2041/2027* (2013.01)

(58) Field of Classification Search
CPC ............. F01L 2013/103; F01L 2201/00; F01L 2820/032
USPC ........................................... 123/90.17, 90.31
See application file for complete search history.

(56) References Cited

U.S. PATENT DOCUMENTS

2008/0065307 A1    3/2008  Tanaka et al.
2008/0257292 A1   10/2008  Inoue
(Continued)

FOREIGN PATENT DOCUMENTS

JP    H07-229410 A    8/1995
JP    H09-117200 A    5/1997
(Continued)

*Primary Examiner* — Jorge Leon, Jr.
(74) *Attorney, Agent, or Firm* — Posz Law Group, PLC

(57) ABSTRACT

A motor driver for driving a motor in a valve timing controller of an internal combustion engine, including an Electronic Driver Unit (EDU) that, upon receiving a target rotation cycle as the instructed rotation cycle, instructs a rotation controller to (i) calculate a duty value of a Pulse Width Modulation (PWM) signal for driving the motor based on an instructed rotation cycle and an actual rotation cycle and (ii) output a calculation result of the duty value to a motor drive unit, with the rotation controller outputting, to the motor drive unit, an instruction signal that rotates the motor forward along an actual rotation direction, when the calculation result takes a positive value as a duty ratio of the PWM signal, establishing an accurate motor rotation speed control together with an improved responsiveness.

15 Claims, 17 Drawing Sheets

(51) Int. Cl.
*F01L 3/20* (2006.01)
*F01L 1/053* (2006.01)
*F02D 41/00* (2006.01)
*F02D 41/20* (2006.01)

(56) References Cited

U.S. PATENT DOCUMENTS

2009/0101094 A1* 4/2009 Mashiki .................. F01L 1/352
 123/90.17
2009/0121671 A1* 5/2009 Uehama .................. F01L 1/352
 318/809
2012/0291722 A1* 11/2012 Kanda ................. F02D 13/0238
 123/41.02

FOREIGN PATENT DOCUMENTS

| JP | 3084941 B2 | 9/2000 |
| JP | 2002-256906 A | 9/2002 |
| JP | 2008-118823 A | 5/2008 |
| JP | 2010-283908 A | 12/2010 |

* cited by examiner

MOTOR DRIVER OF MOTOR FOR VALVE TIMING CONTROL OF INTERNAL COMBUSTION ENGINE

CROSS REFERENCE TO RELATED APPLICATION

The present application is based on and claims the benefit of priority of Japanese Patent Applications No. 2015-114799, filed on Jun. 5, 2015, and No. 2015-231736, filed on Nov. 27, 2015, the disclosure of which are incorporated herein by reference.

TECHNICAL FIELD

The present disclosure generally relates to a motor driver for driving a motor that controls a valve timing of an internal combustion engine.

BACKGROUND INFORMATION

An electric variable cam timing (VCT) system is developed as a device that optimizes, for example, a valve open/close timing of an air-intake value for supplying air to an engine and an exhaust valve for exhausting an exhaust gas from the engine, based on a variable and continuous control of a cam phase according to a state of driving of a vehicle, such as an engine rotation number, an accelerator opening, and the like, for the purpose of appropriate engine control and torque output.

The prior art in the field, e.g., a technique disclosed in a patent document, (Japanese Patent Laid-Open No. 2008-118823) (patent document 1) listed below, is about a motor rotation control, in which a target motor rotation speed and an actual motor rotation speed are compared with each other with reference to a data table, and an apply voltage to a motor drive circuit is calculated based on such comparison. When the calculated apply voltage takes a negative value, a rotation direction of a motor is reversed from a current/actual rotation direction. More practically, such a technique is used to accurately control a wiper reverse position based on a torque reversing at a transition moment of the calculated apply voltage transitioning from a positive value to the negative value, i.e., a torque direction of a wiper motor is reversed at the transition moment, that is considered as defining a "minus duty position."

For a control of a variable cam shaft phase in the electric VCT system, the variable and continuous phase control of the cam shaft needs to have a high responsiveness. Further, various control factors need to be controlled in terms of motor control of a motor used in such system. That is, the drive force of the motor in the electric VCT system is subject to various factors, i.e., is subject to the change of a reverse electromotive force in a deceleration process of the motor, a fluctuation of the power source voltage and the like. Therefore, an accurate motor rotation speed control with a sufficient responsiveness is not achievable, based on the duty value calculation of simply using a target rotation speed and an actual rotation speed of the motor.

SUMMARY

It is an object of the present disclosure to provide a motor driver for a valve timing control motor in an electric VCT system of an internal combustion engine, which enables an accurate motor rotation speed control in a deceleration process or in a reverse rotation process of the motor in such system with an improved responsiveness of the motor control.

In an aspect of the present disclosure, the motor driver includes a motor drive unit driving a motor for a valve opening control of a valve by controlling a phase of a camshaft in an electric variable cam timing system. For driving such a motor drive unit, a motor rotation cycle obtainer obtains an actual rotation cycle of the motor, and a calculator calculates and outputs, to the motor drive unit, a duty ratio of a pulse width modulation signal for the drive of the motor based on an instructed rotation cycle of the motor, and the actual rotation cycle of the motor obtained by the obtainer. A controller outputs, to the motor driver unit, an instruction signal instructing a "forward" rotation direction, i.e., a rotation along an actual rotation direction of the motor or outputs an instruction signal instructing a "backward" rotation direction, i.e., reversing the actual rotation direction of the motor. In such manner, an accurate motor rotation speed control in a deceleration control process and in a reverse rotation control process of the motor is enabled in the electric VCT system with an improved responsiveness of such motor control.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
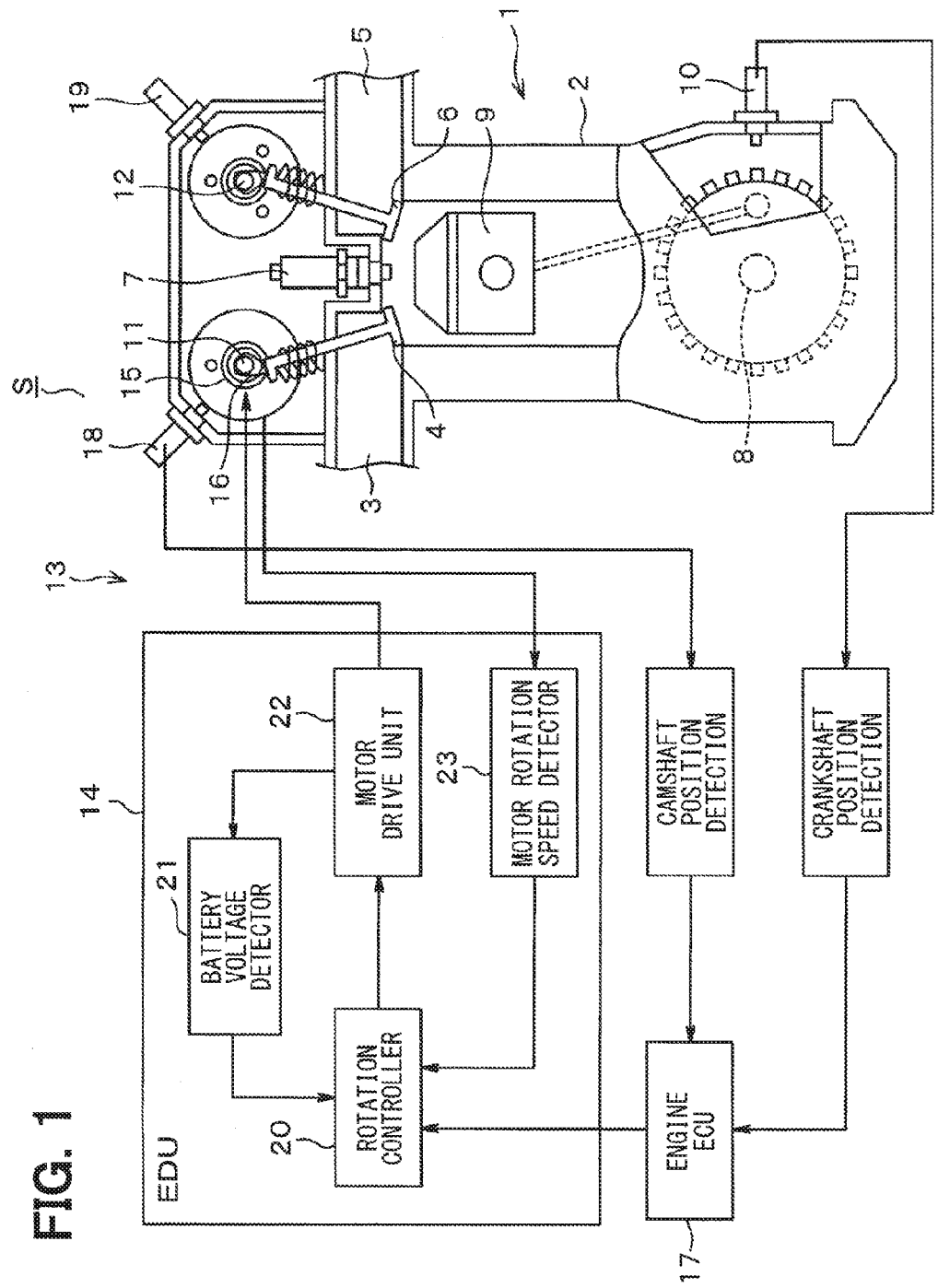
FIG. 1 is a block diagram of an engine system in a first embodiment of the present disclosure.

Hereafter, with reference to the drawings, a few embodiments of a motor driver for performing a valve timing control of an internal-combustion engine are described.

In each of the embodiments described below, the identical or similar numerals are assigned to the identical or similar configuration/components. That is, for example, the same numbers in the last two digits of the numerals represent the same/similar function of the corresponding configuration/components. Therefore, the description of the same configuration regarding the same/similar function is not repeated in the following embodiments.

First Embodiment

FIGS. 1 to 14 are used to illustrate the first embodiment of the present disclosure, about an electric variable cam timing (VCT) system S, in which a drive power of the cam timing system is derived from an electric motor. The electric VCT system is used to optimize a valve timing, i.e., a valve opening timing and a valve closing timing, for a reduction of exhaust emission, for a reduction of a pumping loss and a fuel mileage improvement, and for an increase of an engine output by the improvement of a suction/exhaust air efficiency.

In a body of an engine 1 that is provided as an internal-combustion engine, an engine block 2, an air intake passage 3, an air intake valve 4 disposed in the air intake passage 3, an exhaust passage 5, and an exhaust valve 6 disposed in the exhaust passage 5 are disposed as well as a spark plug 7 for ignition, a crankshaft 8, a piston 9 and the like.

A crank angle sensor 10 is installed on an outside of the crankshaft 8, and the crank angle sensor 10 is used for detecting a crankshaft position.

The kinetic power of the crankshaft 8 is transmitted to a sprocket through a timing chain (not illustrated), and is further transmitted to an air intake camshaft 11 and to an exhaust camshaft 12. The air intake camshaft 11 is equipped with a motor driver 13 for a valve timing control that adjusts an amount of an advance angle of the air intake camshaft 11 relative to the crankshaft 8 (i.e., a VCT phase, a relative rotation phase).

Figure 2:
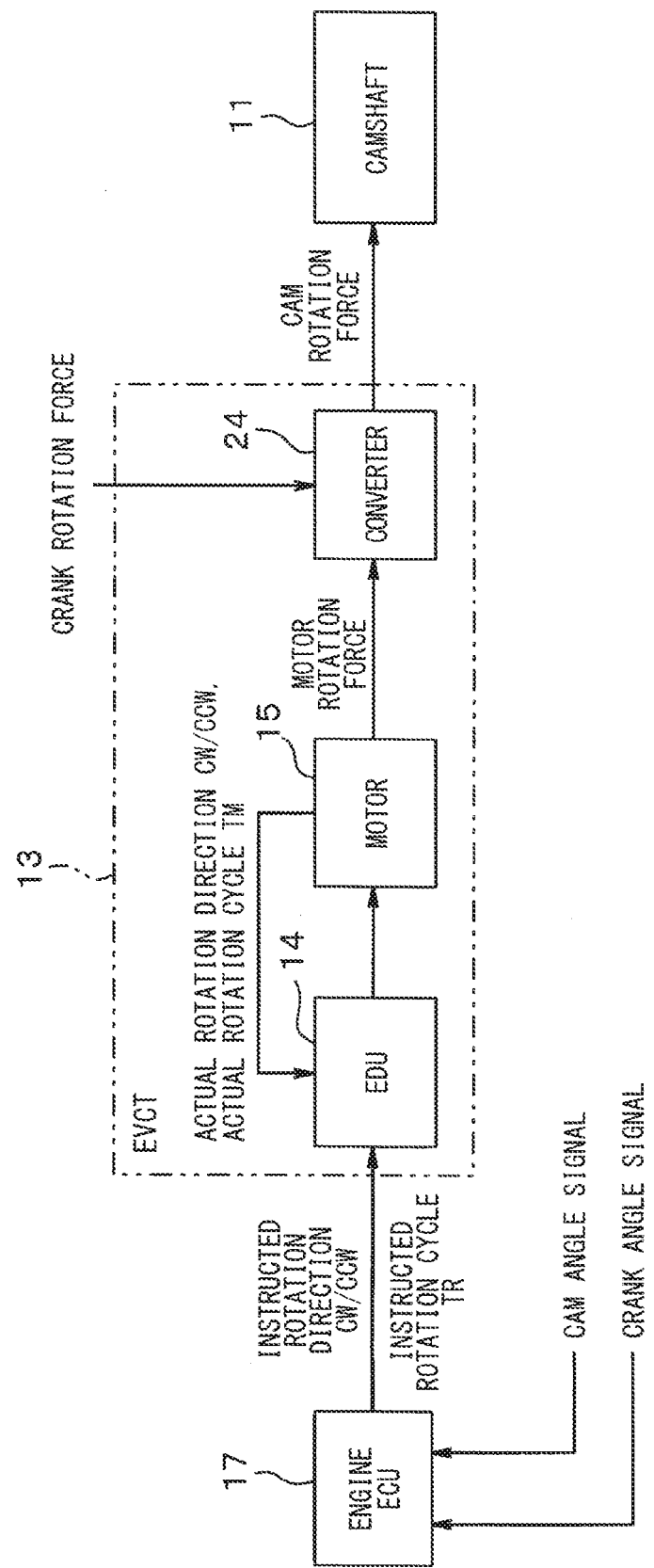
FIG. 2 is a block diagram of an instruction/information flow in association with relevant operations.

FIG. 2 is a block diagram of an instruction/information flow illustrated in association with relevant operations. As shown in FIG. 2, the motor driver 13 for the valve timing control includes an EDU (Electronic Driver Unit) 14, a motor 15 which operates using a battery electric power, and a converter 24 that changes a phase of the camshaft 11, i.e., by transmitting a rotation force of the motor 15 and the rotation force of the crankshaft 8 to the camshaft 11, for the change of a cam phase of the camshaft 11. When the motor driver 13 receives an instructed rotation direction of CW or CCW and an instructed rotation cycle TR from an engine electric control unit (ECU) 17, the motor driver 13 drives the motor 15 according to these control instructions (i.e., instruction signals), and changes the cam phase of the camshaft 11.

As shown in FIG. 1, an intake cam angle sensor 18 that outputs an angle pulse signal as an air intake cam angle signal at a predetermined cam angle is attached to an outer circumference of the air intake camshaft 11. Further, an exhaust cam angle sensor 19 that outputs an angle pulse signal as an exhaust cam angle signal at a predetermined cam angle is attached to an outer circumference of the exhaust camshaft 12.

The intake cam angle sensor 18 is used for detecting a camshaft position, and is connected to the engine ECU 17.

The EDU 14 is equipped with, as shown by an electrical function block diagram in FIG. 1, the functions as a rotation controller 20 (i.e., a controller), a battery voltage detector 21, a motor drive unit 22, and a motor rotation speed detector 23 (i.e., a motor rotation cycle obtainer and a motor actual rotation direction obtainer).

The battery voltage detector 21 functions as a power source voltage detector for detecting a battery voltage VB, and outputs the detected battery voltage after an Analog-to-Digital (A/D) conversion as a digital value to the rotation controller 20.

The motor rotation cycle detector 23 detects an actual rotation cycle (i.e., an actual rotation speed) of the motor 15, and outputs an actual measurement TM of the actual rotation cycle, and the actual rotation direction Clockwise (CW) or Counter-Clockwise (CCW) to the rotation controller 20.

The intake cam angle sensor 18 detects an air intake cam angle signal, and outputs the air intake cam angle signal to the engine ECU 17 as an intake camshaft position detection signal. Thereby, the rotation position (i.e., the phase) of the air intake camshaft 11 is detectable.

The crank angle sensor 10 outputs a crank pulse signal detected at the predetermined crank angle as a crankshaft position detection signal to the engine ECU 17. Thereby, the rotation position (i.e., the phase) of the crankshaft 8 is detectable.

Further, various sensors (e.g., an air intake pressure sensor, a cooling water temperature sensor, a throttle sensor, etc.: not illustrated) are connected to the engine ECU 17 for detecting an engine operation state.

The engine ECU 17 performs a fuel injection control for driving the air intake valve 4 and the exhaust valve 6 and an ignition control of the spark plug 7, according to the engine operation state detected by the various sensors.

By performing a continuous control of the cam phase by using the electric VCT system S, the opening and closing timing of the air intake valve 4 that supplies the air to the cylinder of the engine block 2, and the opening and closing timing of the exhaust valve 6 that discharges the exhaust gas are respectively optimized.

Based on a phase difference between the phase of the air intake camshaft 11 detectable by the intake cam angle sensor 18 and the phase of the crankshaft 8 detectable by the crank angle sensor 10, for example, the engine ECU 17 calculates a target rotation speed of the motor 15, and outputs the target rotation speed to the EDU 14. Thereby, the engine ECU 17 performs a valve timing control, which controls the actual valve opening/closing timing to match the target valve opening/closing timing.

The rotation controller 20 of the EDU 14 outputs a duty value of a Pulse Width Modulation (PWM) signal (i.e., an equivalent of a duty ratio) as a control value to the motor drive unit 22 based on the detection voltage from the battery voltage detector 21 and the actual rotation cycle and the actual rotation direction of the motor 15 detected by the motor rotation cycle detector 23.

The motor drive unit 22 rotates the motor 15 based on the control value from the rotation controller 20.

The engine ECU 17 receives inputs of the air intake cam angle signal (i.e., a detected camshaft position) and the crank angle signal (i.e., a detected crankshaft position), calculates an instructed rotation cycle TR (i.e., an equivalent of the target rotation speed) and an instructed rotation direction CW or CCW (i.e., an equivalent of a direction of a rotation torque), and outputs them to the rotation controller 20 of the EDU 14.

The EDU 14 performs a feedback control of the motor 15, based on the instructed rotation cycle TR and the instructed rotation direction CW or CCW that are inputted from the engine ECU 17 in addition to the actual rotation cycle TM (i.e., an equivalent of the actual rotation number) of the motor 15 and the actual rotation direction CW or CCW which are detected by the motor rotation cycle detector 23, for controlling the actual rotation number of the motor 15 to match the target rotation number.

Figure 3:
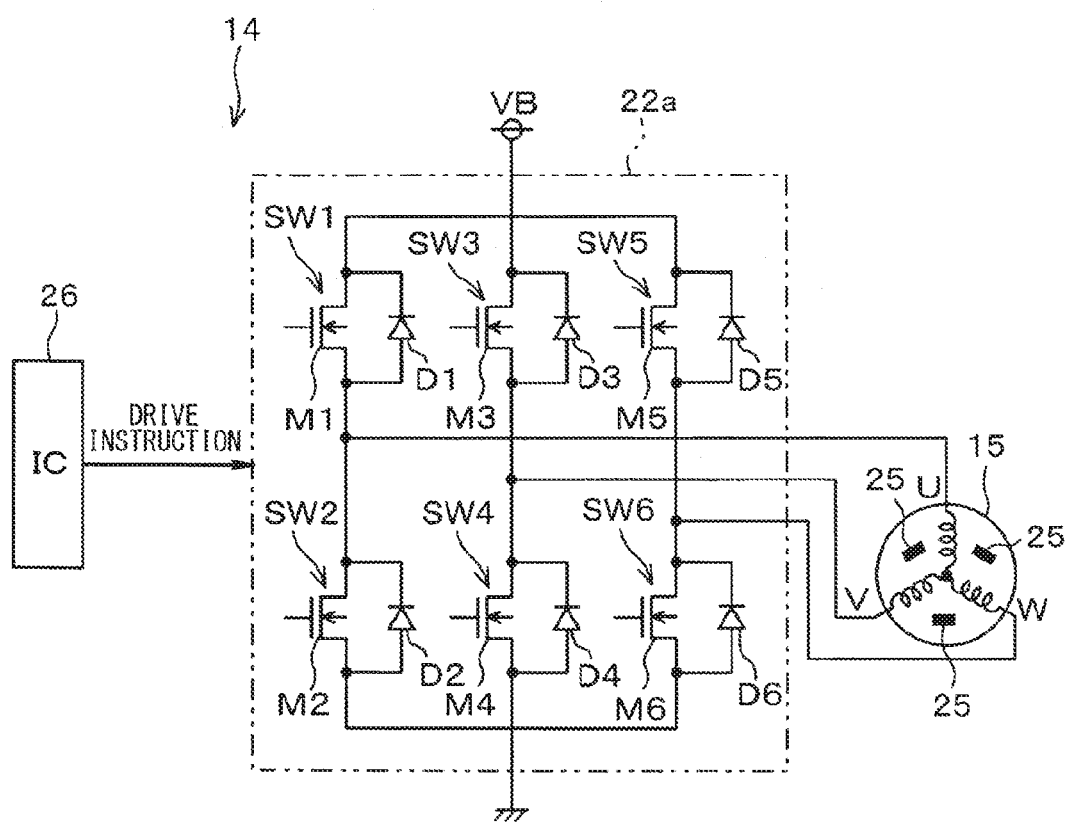
FIG. 3 is a block diagram of an EDU.

The EDU 14 controls the number of rotations of the motor 15 by adjusting the duty value of the PWM signal given to plural switching elements SW1 TO SW6 (refer to FIG. 3).

The converter 24 converts an actual motor rotation force of the motor 15 and a rotation force of the crank into a cam rotation force for rotating a cam, and transmits such a rotation force to the air intake camshaft 11. In the course of such transmission of the rotation force, the cam phase is changed according to the following conditions.

Cam Angle Advance Operation:
a rotation speed of the camshaft 11<a rotation speed of the motor 15

Cam Angle Retard Operation:
a rotation speed of the camshaft 11>a rotation speed of the motor 15

Phase Retainment:
a rotation speed of the camshaft 11=a rotation speed of the motor 15

FIG. 3 shows a part of a physical configuration of the EDU 14. As shown in FIG. 3, the EDU 14 is provided as an electrically-connected combination of a switching section 22a that is provided as switching elements SW1 to SW6 for switching ON and OFF of a supply of an electric current to the motor 15, a magnetic sensor 25 for detecting a position of a rotor of the motor 15, and an integrated circuit (IC) 26 for driving the switching elements SW1 to SW6.

The IC 26 is used as a calculator.

The motor drive unit 22 is equipped with the switching section 22a that is a component having a three-phase connection of the switching elements SW1 to SW6 to a node to which the battery voltage VB is applied, in which the switching elements SW1 to SW6 are respectively provided as N channel type MOS transistors M1 to M6. The MOS transistors M1 to M6 are respectively combined with body diodes D1 to D6 that are reversely connected to a position between the drain and the source of the transistors M1 to M6.

The switching section 22a is formed as a three-phase (U/V/W) connection of the switching elements SW1 to SW6 at a position between a terminal of the battery voltage VB and the ground.

The motor drive unit 22 refers to a flag that is stored in a memory (not illustrated) and is indicative of either of the rotation control mode and the regeneration control mode, and selects a power supply pattern according to the flag, and provides a suitable power supply pattern to the switching section 22a that is realized as the switching elements SW1 to SW6.

Then, the motor drive unit 22, receiving the PWM signal from a PWM signal generator 33 (see FIG. 8 that is mentioned later), drives the motor 15 by a duty value that accords with the received PWM signal.

The motor 15 is implemented as a three-phase, brushless motor, thereby realizing a high reliability and a long product life.

When the IC 26 rotates the motor 15, one of the switching elements SW1, SW3, and SW5 on an upper arm side is turned ON, and one of the switching elements of SW2, SW4, and SW6 on a lower arm side is turned ON, and the other switching elements are turned OFF. At the time of switching ON and OFF of the switching elements, the IC 26 performs an ON-OFF control of the switching elements SW1 to SW6, without using a power supply pattern that allows a large through current to the switching elements.

<Rotation Control Mode>

Figure 4:
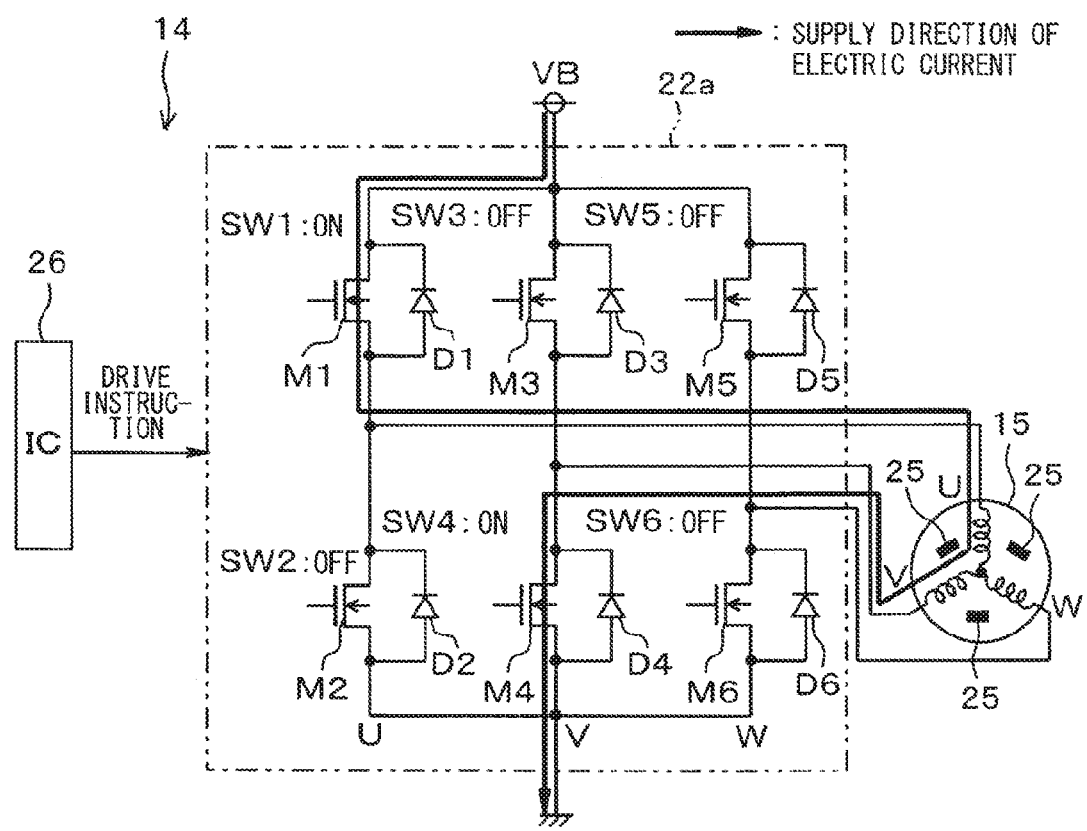
FIG. 4 is a schematic diagram illustrating a supply direction of an electric current by a rotation control of a motor in a rotation control mode.

FIG. 4 shows a supply direction of an electric current, i.e., showing the way/direction the electric current flows, when the rotation control of the motor 15 is performed in the rotation control mode.

The example illustrated in FIG. 4 shows a supply direction of the electric current from U phase to V phase, in which the switching elements SW1 and SW4 are turned ON, and the other switching elements SW2, SW3, SW5, SW6 are turned OFF for flowing the electric current from U phase to V phase.

When the EDU 14 drives the motor 15 by the rotation control in the rotation control mode, the EDU 14 performs the rotation control at a time when a required condition is satisfied, i.e., (i) when the motor 15 is in a stopped state, or (ii) when an instructed torque direction from the engine ECU 17 matches an actual torque direction.

Figure 5:
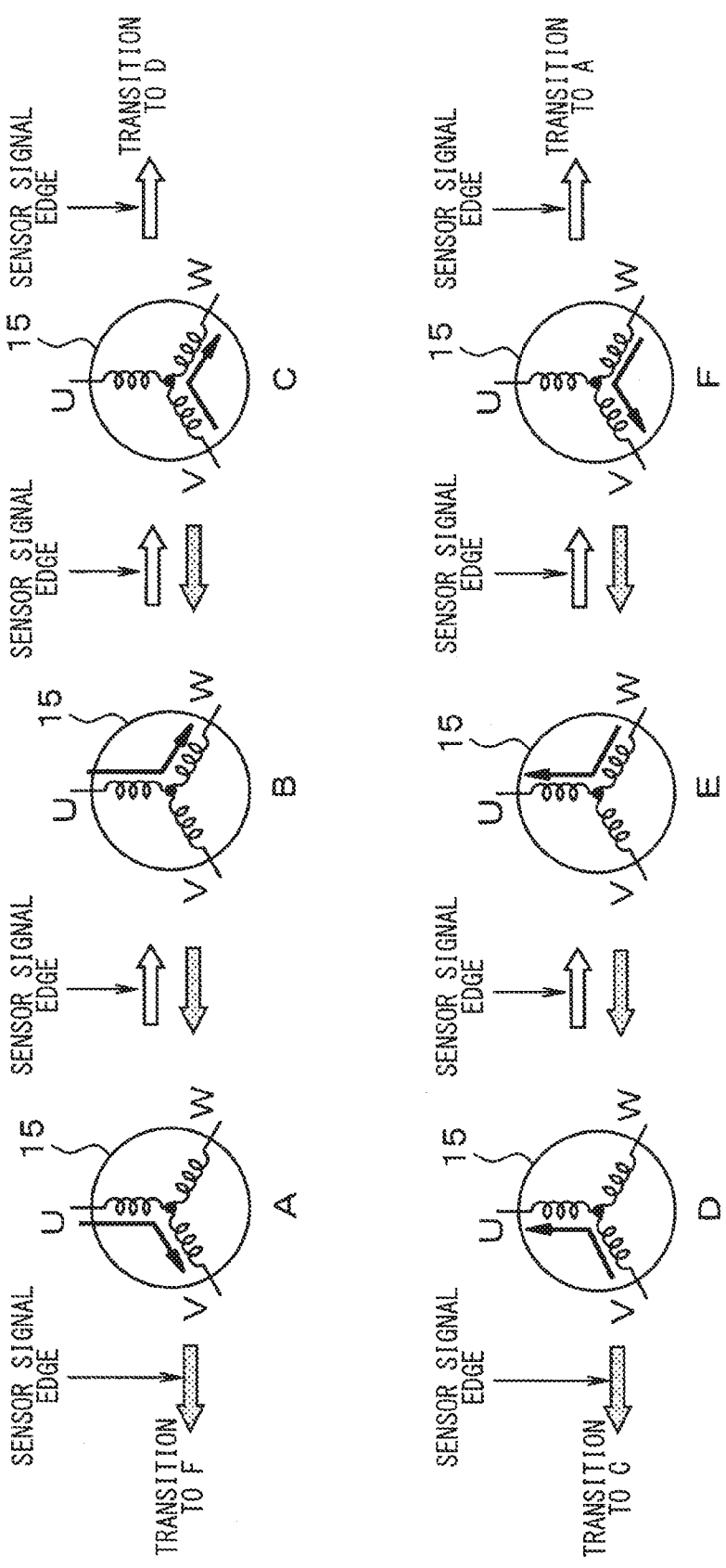
FIG. 5 is an illustration of details of the rotation control of the motor in the rotation control mode.

FIG. 5 shows the control contents, i.e., details, of the rotation control mode of the motor 15. As shown in FIG. 5, when an instructed rotation direction (i.e., an instructed torque direction) by the engine ECU 17 is CCW (i.e., a left-hand rotation direction/a counter-clockwise rotation direction), the rotation controller 20 controls an electric-current supply direction to the rotor of the motor 15 to transit toward the left-hand rotation direction. That is, more practically, the control is performed as follows.

Turn ON switching elements SW1, SW4 (in an upper U phase and a lower V phase)
Turn ON switching elements SW1 TO SW6 (in an upper U phase and a lower W phase)
Turn ON switching elements SW3, SW6 (in an upper V phase and a lower W phase)
Turn ON switching elements SW3, SW2 (in an upper V phase and a lower U phase)
. . . (and so forth)

When the instructed rotation direction (i.e., the instructed torque direction) by the engine ECU 17 is CW (i.e., a right-hand rotation direction/a clockwise rotation direction), the rotation controller 20 controls the electric-current supply direction of the rotor to transit toward the right-hand rotation direction. That is, more practically, the control is performed as follows.

Turn ON switching elements SW1, SW4 (in an upper U phase and a lower V phase)
Turn ON switching elements SW5, SW4 (in an upper W phase and a lower V phase)
Turn ON switching elements SW5, SW2 (in an upper W phase and a lower U phase)
Turn ON switching elements SW3, SW2 (in an upper V phase and a lower U phase)
. . . (and so forth)

The rotation controller 20 uses the PWM signal, when performing the ON-OFF control of the switching elements SW1 to SW6. At the time of control, the IC 26 determines the duty value of the PWM signal based on the following equation 1.

$$PWM\_DUTY = \Delta VB \times \left[ \frac{A}{TR \times TM} \{ B \times TM + C \times (TM - TR) + D \} \right] \quad \text{(Equation 1)}$$

TR: Instructed rotation cycle
TM: Actual rotation cycle
ΔVB: Power source voltage correction coefficient Here, A, B, C, and D are the coefficients of each of the terms, TR is an instructed rotation cycle, Tm is an actual rotation cycle, and ΔVB is a correction coefficient of the battery voltage VB, respectively in the digital data form.

Although, the configuration is functionally described in the above-mentioned FIG. 1, the actual, i.e., physical, configuration of the IC 26 is realized as the calculation of each of those terms in the feedback control equation in sequence for the calculation of the duty value and for the output of the duty vale as the PWM signal to the motor drive unit 22 (see the description in the following).

<Regeneration Control Mode>

On the other hand, i.e., when the motor 15 is rotating, one of the switching elements SW2, SW4, or SW6 on the lower arm side is turned ON in a state in which all of the switching elements SW1, SW3, and SW5 on the upper arm side are turned OFF. Then, the electric current can be sent, i.e., flows, towards the terminal side of the battery voltage VB from the ground side.

Thus, by the turning ON of one of the switching elements SW2, SW4, or SW6 on the lower arm side, an exothermic loss is reduced in comparison to supplying an electric current to the body diodes D2, D4 and D6 of the switching elements SW2, SW4, and SW6 on the lower arm side.

In the regeneration control mode, the electric current flows through the body diode D1 of the switching element SW1 on the upper arm side. In the regenerative control, the motor 15 operates in the regeneration state, i.e., the rotation of the motor 15 slows down, and recovers and collects an electric power to the battery voltage VB.

Figure 6:
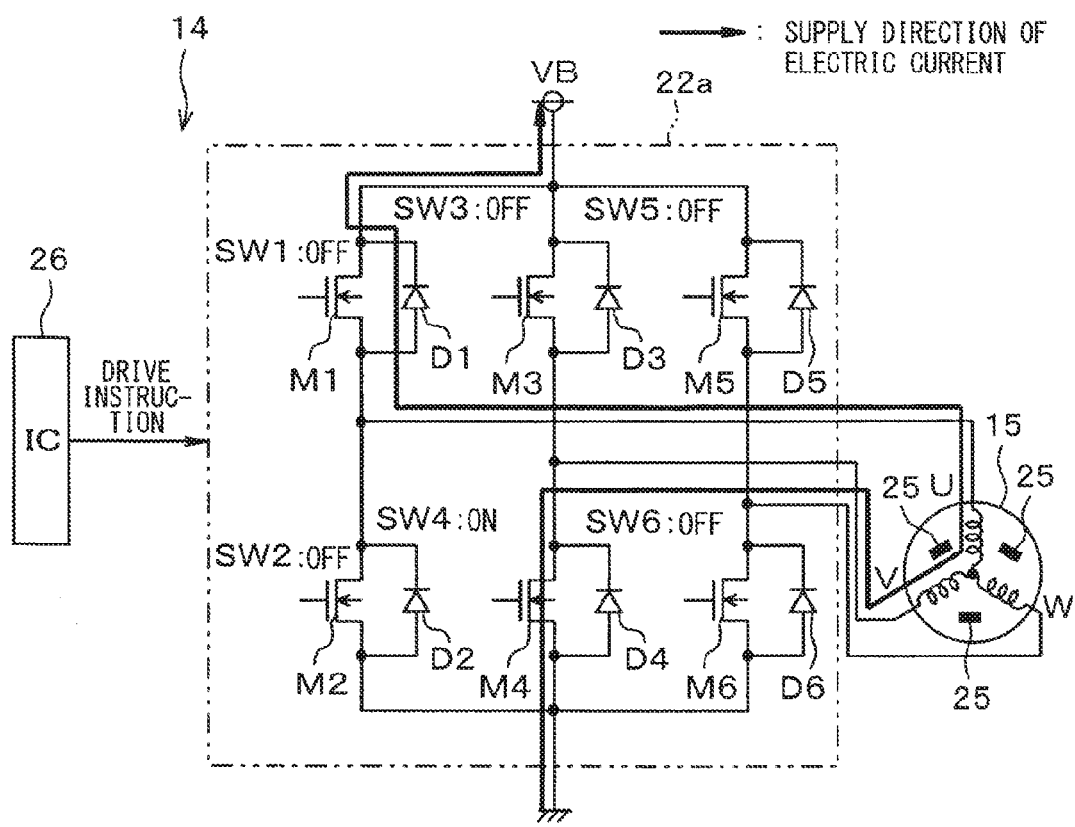
FIG. 6 is a schematic diagram illustration a supply direction of an electric current by a control of the motor in a regeneration control mode.

FIG. 6 shows a supply direction of the electric current when controlling the motor 15 in the regeneration control mode. The example illustrated in FIG. 6 shows a supply direction of the electric current from V phase to U phase.

Figure 7:
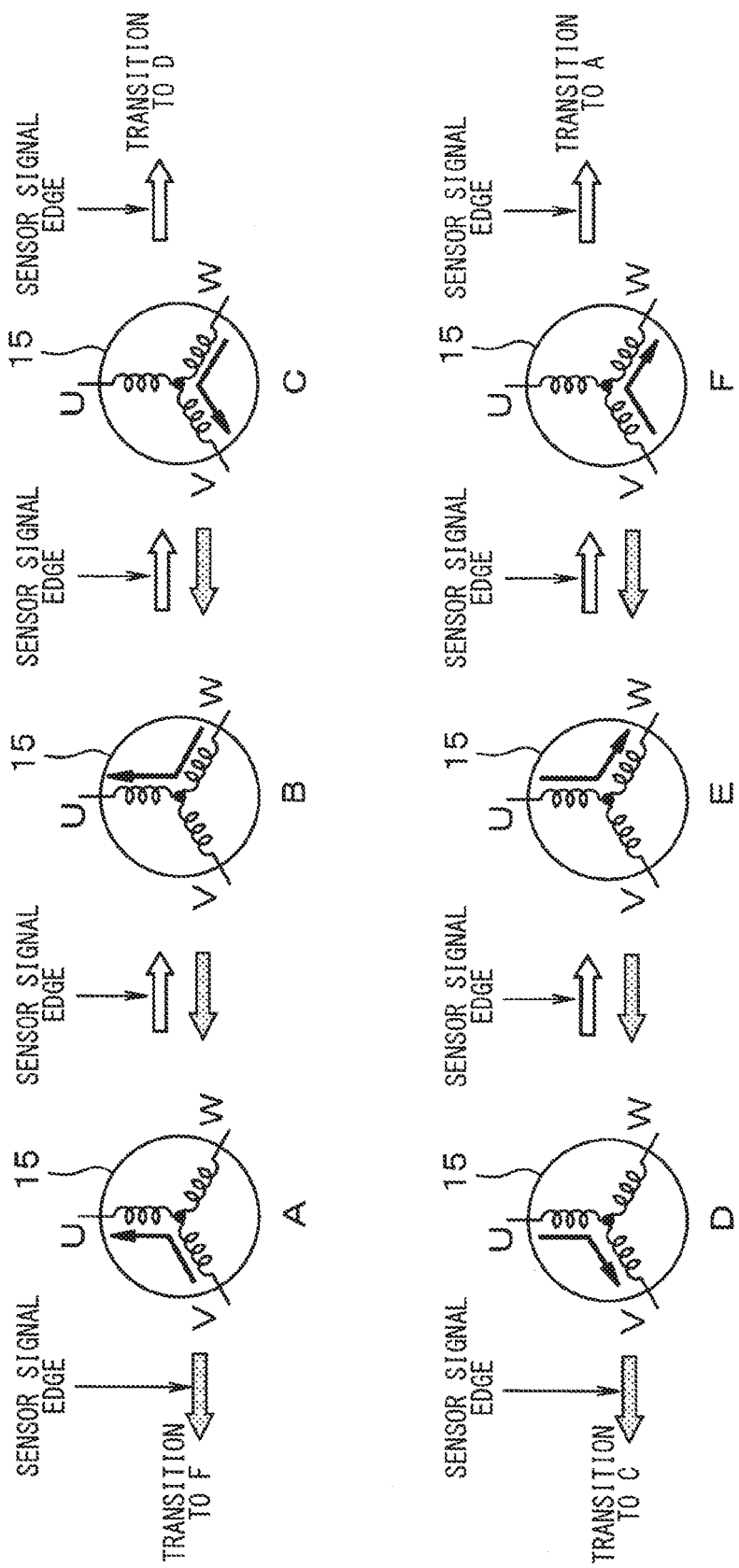
FIG. 7 is an illustration of details of the control of the motor in the regeneration control mode.

The control contents about the control of the motor 15 in the regeneration control mode are shown in detail in FIG. 7.

As shown in the FIG. 7, when the instructed rotation direction by the engine ECU 17 is CCW (i.e., the left-hand rotation direction/the counter-clockwise rotation direction), the rotation controller 20 controls the electric-current supply direction to the rotor coil to transit toward the left-hand rotation direction.

On the contrary, when the instructed rotation direction by the engine ECU 17 is CW (i.e., the right-hand rotation direction/the clockwise rotation direction), the rotation controller 20 controls the electric-current supply direction to the rotor coil to transit toward the right-hand rotation direction.

The regeneration control is performed when the instructed rotation direction from the engine ECU 17 does not match the actual rotation direction.

Figure 8:
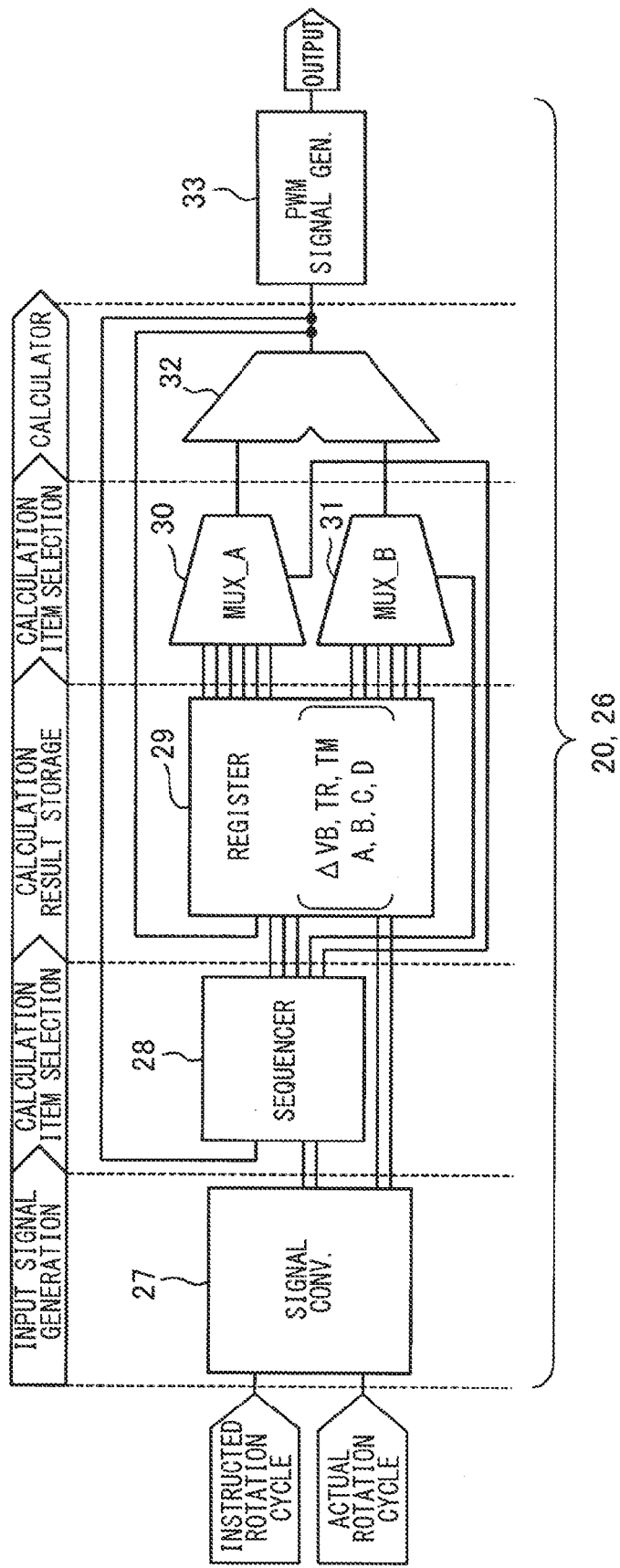
FIG. 8 is a block diagram of an integrated circuit regarding a physical configuration.
Figure 9:
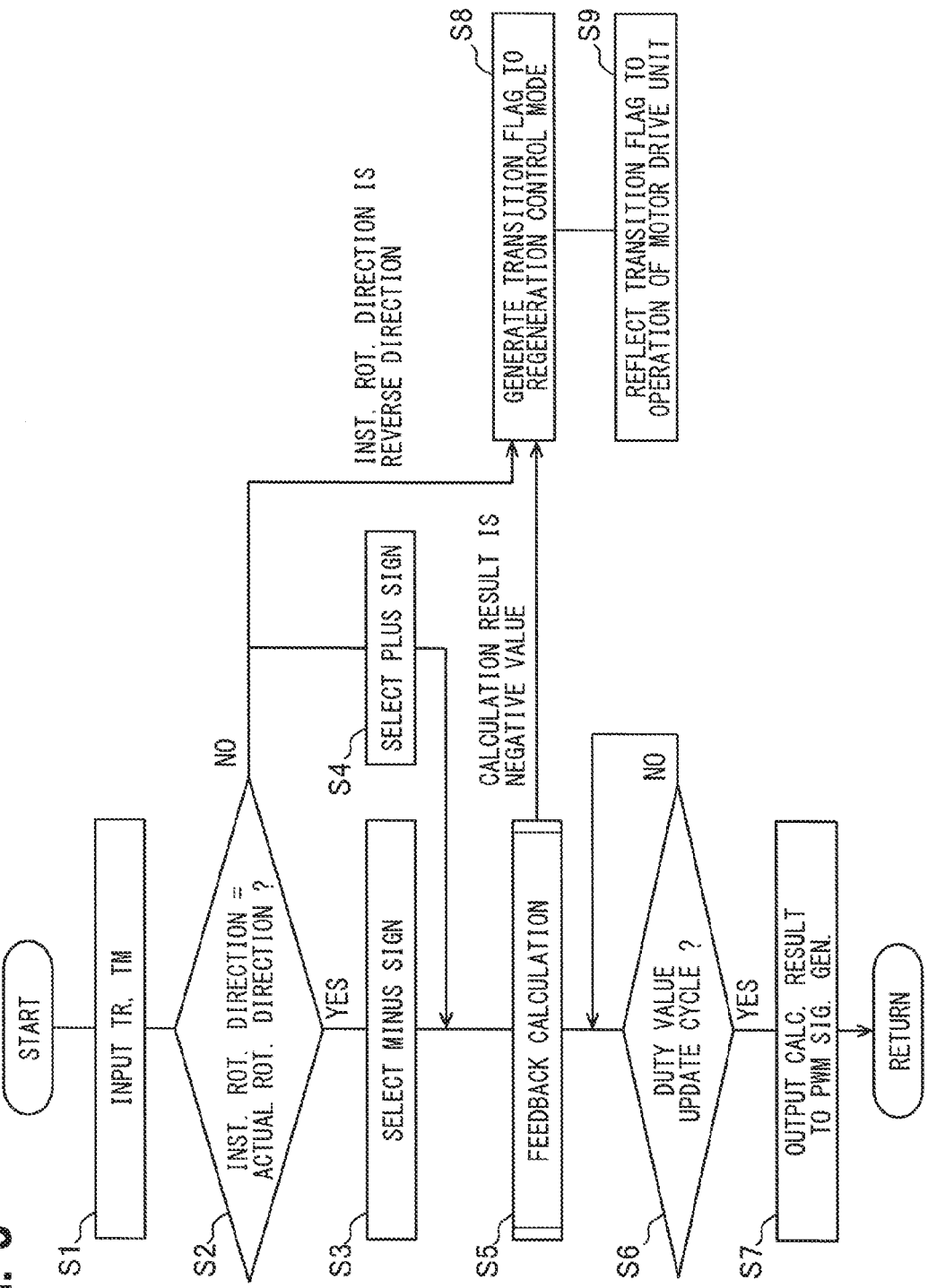
FIG. 9 is a flowchart of a process regarding process operation contents.

FIG. 8 shows an example of the physical configuration in the IC 26 of the rotation controller 20, and FIG. 9 shows an outline of the process performed in the IC 26 as a flowchart.

As shown in FIG. 8, the IC 26 includes a signal converter 27, a sequencer 28, a register 29, multiplexers 30 and 31, a calculator 32, and a PWM signal generator 33, and the illustrated portion serves at least as a part of the rotation controller 20.

When the instructed rotation cycle TR and the actual rotation cycle TM are given to the rotation controller 20, the signal converter 27 performs a digital conversion process for the instructed rotation cycle TR and the actual rotation cycle TM, and outputs the converted value as an input to the sequencer 28.

The multiplexer 30 selectively outputs a stored value from the register 29 according to an instruction of the sequencer 28, and the calculator 32 calculates an output value.

The sequencer 28 controls, for each of the terms of the equation 1 in sequence, a selection of the value by the multiplexers 30 and 31 and the calculation process by the calculator 32, as the feedback calculation, and outputs the calculation result of the calculator 32 to the PWM signal generator 33.

The PWM signal generator 33 generates a PWM signal based on the calculation result of the calculator 32, and outputs the signal to the motor drive unit 22.

When the actual rotation speed of the motor 15 is a high speed, the battery voltage VB varies/fluctuates because a large electric current flows to the motor 15. When the battery voltage VB falls down, the duty value of the PWM signal may be changed. This is because a torque applied to the motor 15 falls down when the battery voltage VB falls down, which makes it impossible to maintain the rotation speed of the motor 15.

On the contrary, when the battery voltage VB increases from a standard value, the torque applied to the motor 15 may be increased. Therefore, the duty value of the PWM signal may be corrected according to the variation/fluctuation of the battery voltage VB by providing a correction coefficient ΔVB of the battery voltage VB in the equation (1) of the feedback control, for compensating the variation/fluctuation of the battery voltage VB. In such manner, the rotation speed of the motor 15 is maintained at a constant value.

Figure 10:
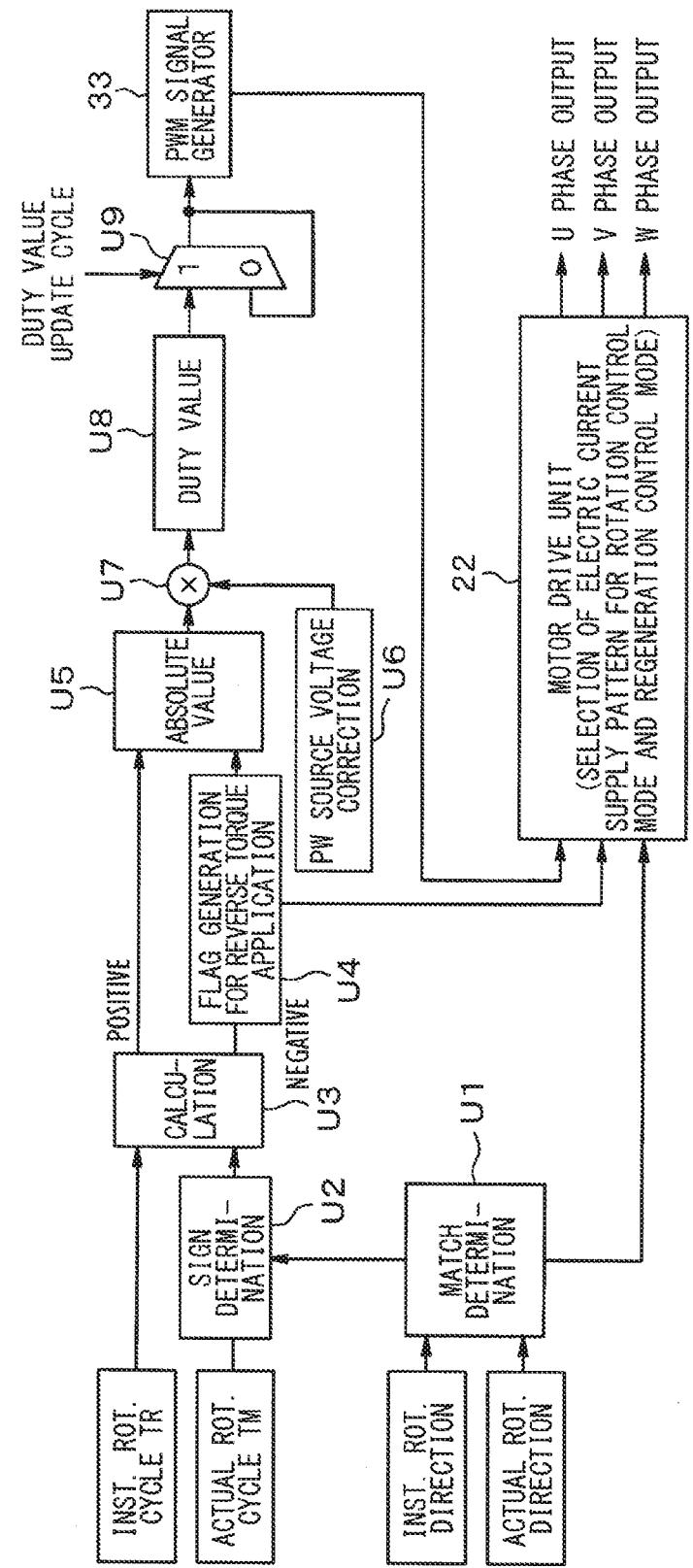
FIG. 10 is an illustration of a sequence of the process operation contents.

FIG. 9 is a flowchart of a process regarding the contents of the process operation of the sequencer 28, the calculator 32 and the like, and FIG. 10 shows the flow of such a process by those components.

According to the present embodiment, when the instructed rotation direction is different from the actual rotation direction, the sign of the computing equation is reversed with the calculation result (i.e., an absolute value of the calculation) kept unchanged, for controlling the torque direction reversed to be in a reverse direction relative to the actual rotation direction of the motor 15, which is considered as one feature of the present disclosure.

Further, in the present embodiment, the following three points may also be considered as the features of the present disclosure. That is, (i) when the calculation result of the duty value of the PWM signal takes a negative value, before reflecting the calculation result of the duty value, an instruction signal is output to the motor drive unit 22 to apply a reverse torque to the motor 15 which is in a reverse direction relative to the actual rotation direction of the motor 15, and (ii) when the calculation result of the duty value of the PWM signal takes a negative value, the sign of the duty value is replaced with a positive sign and an absolute value of the calculation result is output as the duty value to the motor drive unit 22, and (iii) when an instruction signal is given to instruct the motor 15 to rotate in a reverse rotation direction relative to the actual rotation direction, the regeneration control of the motor 15 is performed.

As shown in FIG. 9, when the rotation controller 20 receives an input of the information about the instructed rotation cycle TR and the actual rotation cycle TM (S1 of FIG. 9), it is determined whether the instructed rotation direction to the rotation controller 20 of the EDU 14 from the engine ECU 17 is a reverse direction of the actual rotation direction (S2 of FIG. 9, U1 of FIG. 10).

Then, the rotation controller 20 selects one of the plus sign or the minus sign in a term "C×(TM±TR)" in the equation 1, according to the determination result (U2 of FIG. 10). That is, when the instructed rotation direction matches the actual rotation direction (YES in S2 of FIG. 9), the minus sign (i.e., − sign) is selected (S3 of FIG. 9, U3 of FIG. 10). In other words, the term "C×(TM±TR)" in the equation 1 is used as a term "C×(TM−TR)".

When, on the contrary, the instructed rotation direction is determined as a reverse direction of the actual rotation direction in Step S2 (NO in S2 of FIG. 9), the plus sign (i.e., + sign) is selected (S4 of FIG. 9). In other words, the term "C×(TM±TR)" in the equation 1 is used as a term "C×(TM+TR)".

When the instructed rotation direction does not match the actual rotation direction, the instruction from the engine ECU 17 to the EDU 14 instructs a reverse rotation of the motor 15 (i.e., reversing the actual rotation direction of the motor 15). Therefore, at such timing, the rotation controller 20 generates a transition flag that indicates a transition to the regeneration control mode for an application of a reverse torque (S8 of FIG. 9, U4 of FIG. 10), stores the transition flag to a non-illustrated memory, and controls the operation of the motor drive unit 22 accordingly, i.e., reflecting the transition flag to the operation of the motor drive unit 22 (S9 of FIG. 9).

When the motor 15 is reversely rotated, it is desirable to apply a strong/large torque in a reverse direction against the actual rotation direction of the motor 15. However, even when the calculation result of the equation 1 is directly used as a reverse torque, the reverse torque may be weak and not sufficient for reversing the rotation direction of the motor 15. In such case, the plus sign of the term "C×(TM±TR)" in the equation 1 is selected, and the calculation result of the equation 1 is output with the plus sign to the motor drive unit 22 as the PWM signal. By performing such a control, the reverse torque at the rotation direction unmatching time is expected to be sufficiently strong.

Then, the rotation controller 20 starts to perform a feedback calculation process based on the equation 1 in which the sign of the term "C×(TM±TR)" is determined in Step S3 or S4 (S5 of FIG. 9).

Figure 11:
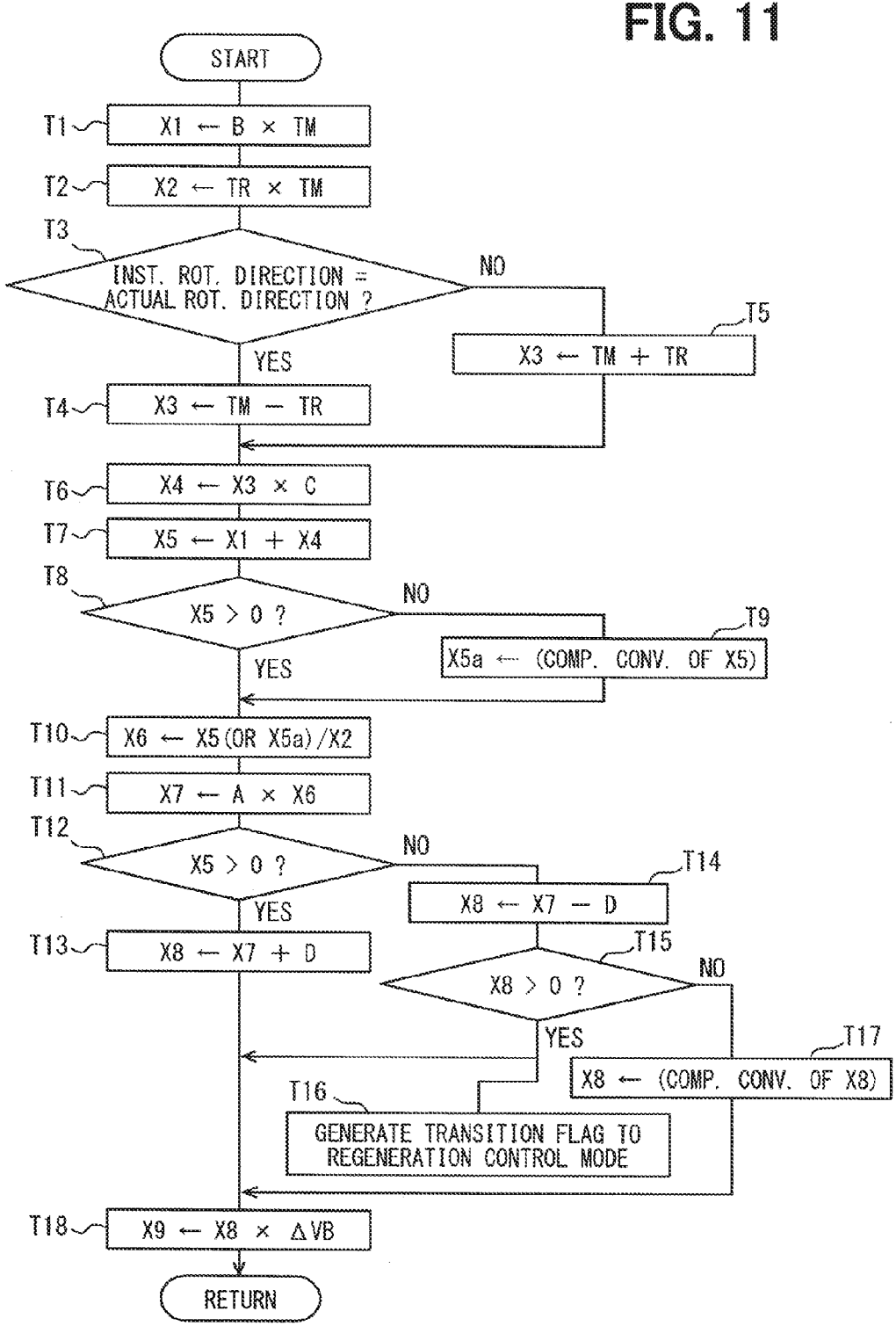
FIG. 11 is a flowchart of details of a feedback operation.

FIG. 11 shows a detail of the calculation of the feedback operation, i.e., the calculation of the equation 1, as a flowchart. As shown in FIG. 11, the IC 26 of the rotation controller 20 selects the calculation of "B×TM" under control of the sequencer 28, performs the selected calculation by using the register 29, the multiplexers 30 and 31, and the calculator 32, and designates the calculation result as a value X1 (T1 of FIG. 11). Then, the calculation of "TR×TM" is selected by the sequencer 28, and the calculation result is designated as a value X2 (T2 of FIG. 11).

When the instructed rotation direction matches the actual rotation direction (YES in T3 of FIG. 11), the calculation of "TM−TR" is selected and the calculation result is designated as a value X3 (T4 of FIG. 11), and, when the instructed rotation direction is a reverse direction of the actual rotation direction, the calculation of "TM+TR" is selected under control of the sequencer 28 and the calculation result is designated as a value X3 (T5 of FIG. 11).

Then, the IC 26 selects the calculation of "X3×C" under control of the sequencer 28, and the calculation result is designated as a value X4 (T6 of FIG. 11). Further, the IC 26 selects the calculation of "X1+X4" under control of the sequencer 28, and the calculation result is designated as a value X5 (T7 of FIG. 11). By performing a sequence of steps T1 to T7 as a calculation process, the calculation of the term "B×TM+C×(TM±TR)" in the equation 1 is performed.

Then, the IC 26 determines whether the value X5 is a positive value by checking MSB (Most Significant Bit) etc., for example (T8 of FIG. 11), and, when a negative value is obtained from such determination, the value X5 is converted by a complementary conversion to be a value X5a (NO in T8 of FIG. 11, and T9 of FIG. 11), which means that the absolute value of X5 is used (U5 of FIG. 10).

The IC 26 then selects the calculation of X5 (or X5a)/X2, and the calculation result is designated as a value X6 (T10 of FIG. 11).

The IC 26 selects the calculation of A×X6, and the calculation result is designated as a value X7 (T11 of FIG. 11).

When it is determined whether the value X5 calculated in Step T7 is a positive value (T12 of FIG. 11), and, when the value X5 is determined as a positive value, the IC 26 adds D to the value X7, designating it as a value X8 (T13 of FIG. 11). When the value X5 is determined as a negative value, the IC 26 subtracts D from the value X7, designating it as the value X8 (T14 of FIG. 11).

The IC 26 generates the transition flag for the transition to the regeneration control mode (T16 of FIG. 11), when the value X8 is a positive value (YES in T15 of FIG. 11), and controls the operation of the motor drive unit 22 to transit to the regeneration control mode.

Further, in parallel with such an operation, the value X8 is multiplied by the correction coefficient ΔVB of the battery voltage to have a value X9 (T18 of FIG. 11, and U6, U7 of FIG. 10), and the IC 26 then outputs the value X9 as the calculation result of the duty value (U8 of FIG. 10).

When the value X8 is equal to zero or less than zero in Step T14 (NO in T15 of FIG. 11), the IC 26 performs a complementary conversion for the value X8 to have the absolute value of X8, for using the value X8 as a positive value (T17 of FIG. 11), multiplies X8 by the correction coefficient ΔVB of the battery voltage to have the value X9 (T18 of FIG. 11), and outputs the value X9 as a calculation result of the duty value (U8 of FIG. 10).

As shown in FIG. 9, even when the feedback calculation process by the IC 26 is finished, the calculation result of the IC 26 is not reflected to a drive output of the motor drive unit 22 until a timing of an update cycle, i.e., is reflected to the duty value at a timing of the update cycle thereof (S6 of FIG. 9, U9 of FIG. 10).

<Details of an Instruction Timing>

(A) Normal Time of Having a Positive Duty Value

Figure 12:
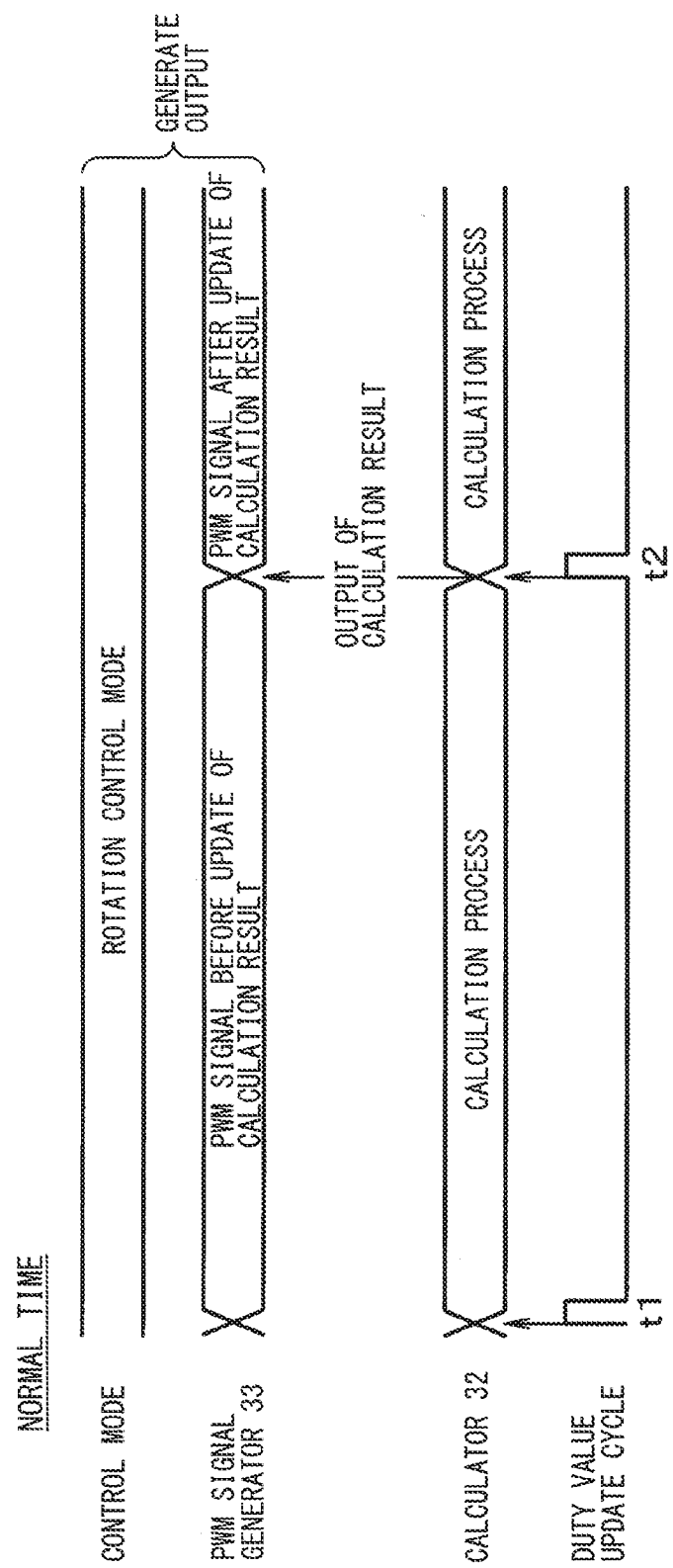
FIG. 12 is a timing chart of an instruction timing to a gate driver in a first example.

The instruction timing of the rotation controller 20 to the motor drive unit 22 when the IC 26 calculates the duty value as a positive value in a normal time is described in FIG. 12.

The motor drive unit 22 receives (i) the transition flag to the various modes (i.e., the rotation control mode, the regeneration control mode) and (ii) the PWM signal from the PWM signal generator 33 based on the calculation result of the IC 26, for driving the motor 15.

In a normal time, the EDU 14 receives an instruction of the same rotation direction as the actual rotation direction from the engine ECU 17, the rotation controller 20 outputs an instruction signal to the motor drive unit 22 to rotate the motor 15 in the same rotation direction as the actual rotation direction, thereby causing the motor drive unit 22 to rotate the motor 15 in the same rotation direction as the previous instruction.

Therefore, as shown in FIG. 12, the duty value of the PWM signal generated by the PWM signal generator 33 is updated at a certain cycle (i.e., at a timing of t1 and t2 in FIG. 12).

(B) a Reverse Rotation Instruction of Motor

Figure 13:
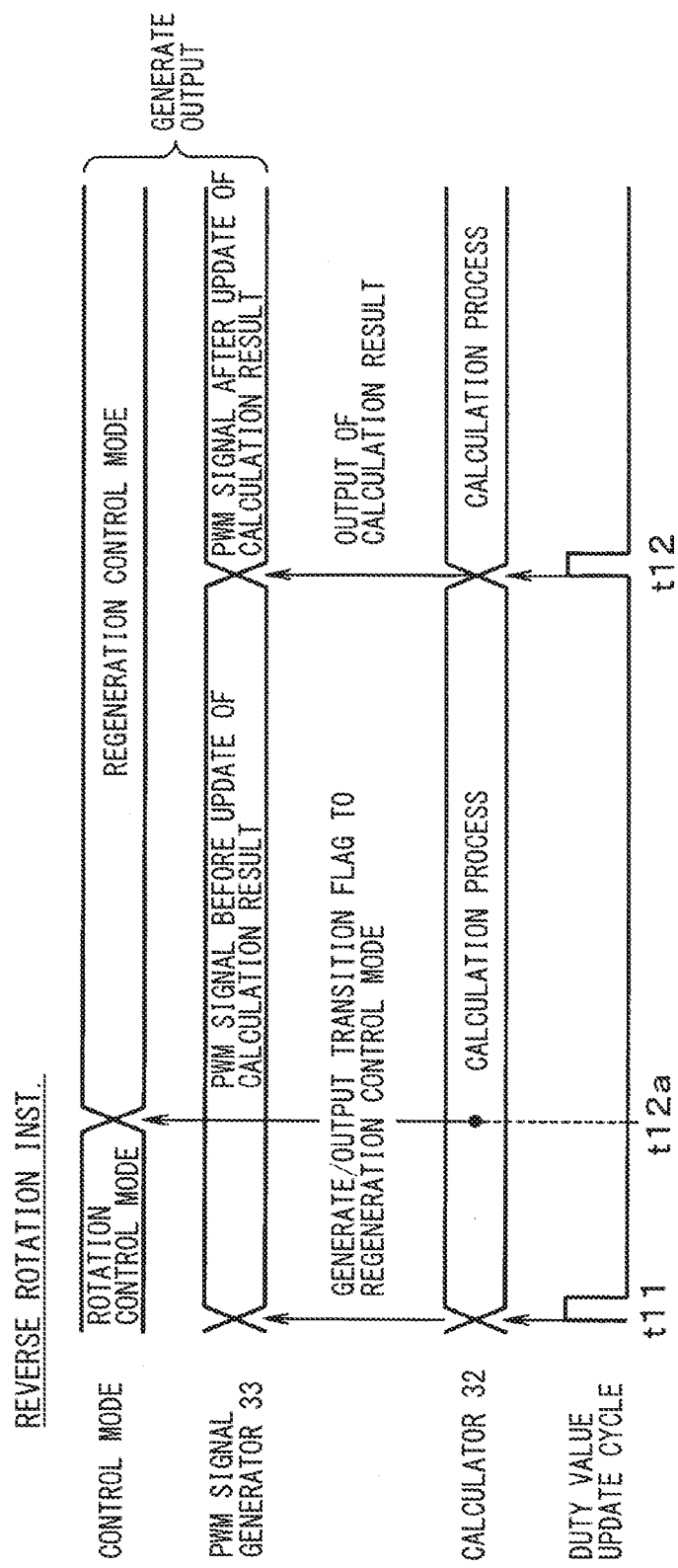
FIG. 13 is a timing chart of an instruction timing to a gate driver in a second example.

The instruction timing to the motor drive unit 22 when the EDU 14 receives an instruction of reversing the rotation direction (i.e., an instruction of changing a rotation direction CW to CCW or CCW to CW) of the motor 15 from the engine ECU 17 is shown in FIG. 13.

When the EDU 14 receives an instruction from the engine ECU 17 to rotate the motor 15 reversely in the reverse direction relative to the actual rotation direction, an application of a reverse torque in the reverse direction is determined at a determination timing of Step T3:NO in FIG. 11.

In such case, the rotation controller 20 outputs an instruction signal to the motor drive unit 22 so that the motor 15 is rotated in the reverse direction relative to the actual rotation direction, and controls the control mode of the motor 15 by the motor drive unit 22 to transit to the regeneration control mode from the rotation control mode, as shown in FIG. 13.

Then, at a cyclical update timing of the duty value, the IC 26 of the rotation controller 20 outputs the calculation result of the duty value to the motor drive unit 22, and the update of the duty value is reflected to the drive output from the motor drive unit 11 (Timing t12 of FIG. 13).

That is, before reaching at the timing t12, at a timing of determining Step T3:NO, the transition flag to transit to the regeneration control mode is generated in advance, and the rotation controller 20 outputs an instruction signal to the motor drive unit 22 to rotate the motor 15 in a reverse direction reversely relative to the actual rotation direction (Timing t12a of FIG. 13).

By outputting an instruction signal from the rotation controller 20 to the motor drive unit 22, the motor drive unit 22 performs a supply control of the electric current that enables an application of the reverse torque to the motor 15, reversing the rotation of the motor 15 relative to the actual rotation direction.

In case that, by a quick transition to the rotation control mode of the reverse rotation, the motor 15 may possibly generate a large reverse torque and may possibly cause a flow of a large electric current to the motor drive unit 22, it may be preferable to transit to the regeneration control mode for the time being, for collecting the energy by returning a regeneration electric current to the terminal of the batter voltage VB and for a reduction of the rotation speed, then to transit again to the rotation control mode of the reverse rotation thereafter (i.e., such a timing after timing t12 in FIG. 13 not illustrated).

Thus, by the transition of the control modes, the torque direction of the motor 15 is quickly changeable as soon as possible, without causing a flow of a large electric current to the switching section 22a of the motor drive unit 22. As a result, the rotation speed of the motor 15 is quickly controllable to an instructed rotation speed.

(C) when the Calculation Result is a Negative Value.

Figure 14:
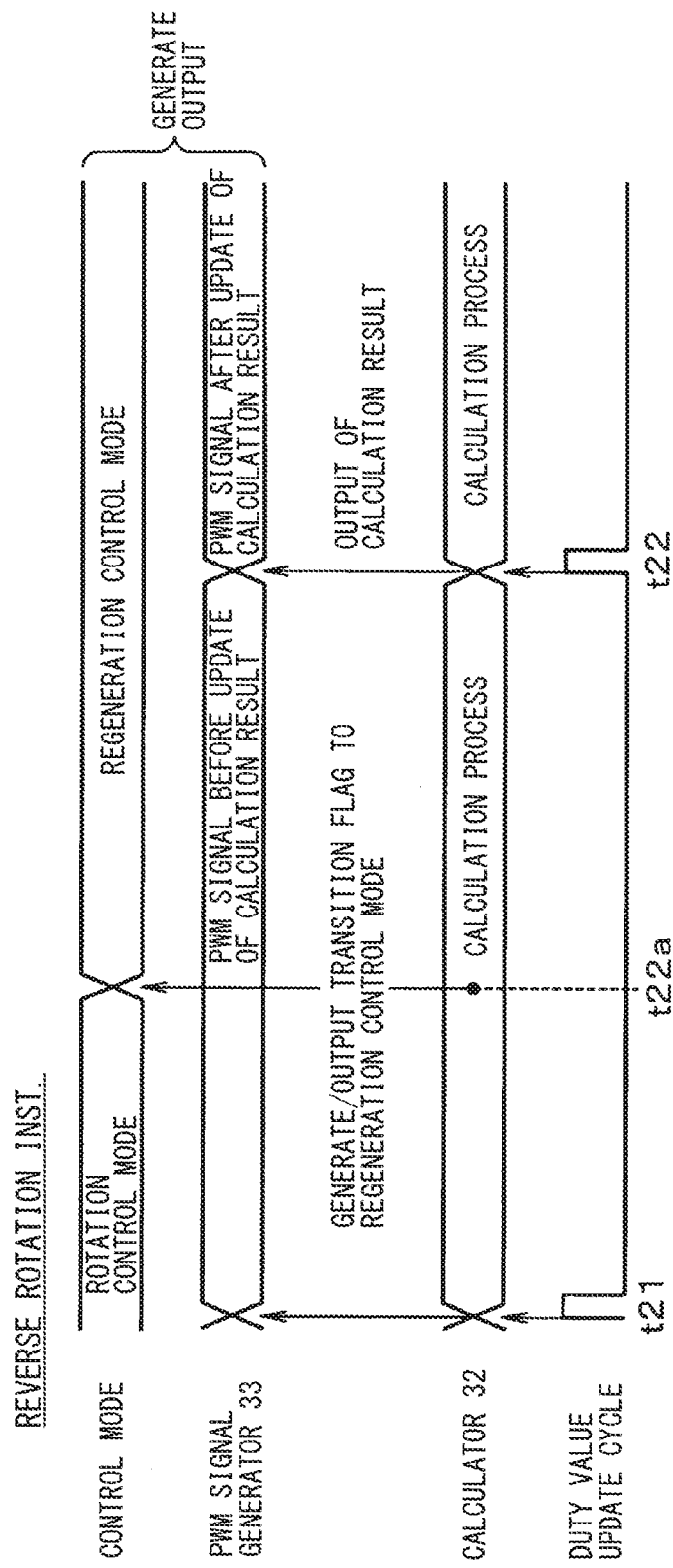
FIG. 14 is a timing chart of an instruction timing to a gate driver in a third example.

The instruction timing to the motor drive unit 22 by the rotation controller 20 when the calculation result of the IC 26 is a negative value is shown in FIG. 14.

When the engine ECU 17 instructs the EDU 14 to decelerate the rotation speed of the motor 15 by a large amount, the IC 26 obtains the calculation result of the duty value of the equation 1 as a negative value. In such case, as shown in FIG. 14, the rotation controller 20 controls the control mode of the motor drive unit 22 to transit from the rotation control mode to the regeneration control mode, and outputs the calculation result to the motor drive unit 22.

More practically, although the IC 26 is going to reflect the calculation result of the duty value to the drive output of the motor drive unit 22 at a timing of an update cycle of the duty value (Timing t22 of FIG. 14), before transiting to such a process of reflecting the calculation result to the drive output, the IC 26 generates the transition flag to transit to the regeneration control mode in advance in Step T15, and the transition flag is output to the motor drive unit 22 (Timing t22a of FIG. 14).

Therefore, when the EDU 14 receives such sudden deceleration instruction, the motor drive unit 22 performs a supply control of the electric current to immediately reverse the torque direction of the motor 15 by generating and outputting the transition flag to the motor drive unit 22, for the transition to the regeneration control mode.

Thereby, the torque direction of the motor 15 is more quickly reversed from the actual rotation direction than, i.e., at a timing earlier than, an update cycle of the duty value of the PWM signal.

Then, after arriving at the update cycle of the PWM signal, the rotation cycle of the motor 15 is quickly controlled to the instructed rotation cycle TR by outputting the calculation result to the motor drive unit 22.

Further, even though the responsiveness of the rotation speed reduction is improved by reversing the torque direction of the motor 15 from the actual rotation direction, if the duty value of the PWM signal stays at a certain preset value exceeding 0, i.e., stays at a certain positive value (i.e., a constant value), a torque of the motor 15 in such a state does not accord with the instructed rotation cycle TR and the actual rotation cycle TM.

Therefore, even when the calculation result of the calculator 32 is a negative value, the calculation result of the calculator 32, as an absolute value (i.e., a non-constant value), is output as an instruction of the duty value to the motor drive unit 22. By performing such control, a suitable rotation speed control is performed at the time of the speed reduction.

Further, when a reverse torque is applied against the actual rotation direction of the motor 15, a large electric current flows to the switching section 22a of the motor drive unit 22 due to a generation of a reverse electromotive force. However, the electric current returns to the terminal of the battery voltage VB in the regeneration control mode, and is collected as energy.

The present embodiment may be summarized in the following manner.

When the EDU 14 receives an instruction of a target value of the rotation cycle of the motor 15 as the instructed rotation cycle TR, the IC 26 calculates the duty value of the PWM signal for driving the motor 15 based on the instructed rotation cycle TR and the actual rotation cycle TM of the motor 15, and outputs the calculation result to the motor drive unit 22.

When the calculation result is obtained as a positive duty ratio of the PWM signal by the IC 26, the rotation controller 20 outputs an instruction signal to the motor drive unit 22 so that the motor 15 is rotated in/along the actual rotation direction.

When the calculation result is obtained as a negative duty value of the PWM signal with by the IC 26, the rotation controller 20 outputs an instruction signal to the motor drive unit 22 to rotate the motor 15 in a reverse direction against the actual rotation direction.

Thereby, when reducing the rotation speed of the motor 15 or performing a reverse rotation of the motor 15 for controlling the camshaft 11 in the electric VCT system S, the accuracy and/or the responsiveness of the rotation speed control is improved.

When the calculation result is obtained as a negative duty ratio of the PWM signal by the IC 26, a supply control of the electric current for applying a reverse torque to the motor 15 is performed by an output of an instruction signal from the rotation controller 20 to the motor drive unit 22 which instructs a reverse rotation of the motor 15 in the reverse direction, before reflecting the calculation result of the duty value of the PWM signal to the drive output of the motor drive unit 22. That is, the output of the instruction signal from the controller 20 to the drive unit 22 is performed at a timing before reflecting the duty value to the drive output of the drive unit 22.

Thereby, the responsiveness of the rotation speed control is improved when reducing the rotation speed of the motor 15.

The IC 26 replaces the negative sign of the duty ratio of the PWM signal with the positive sign when the calculation result of the duty value of the PWM signal is obtained as a negative value, and, when the calculation result is obtained, the absolute value of the calculation result is output as the duty value to the motor drive unit 22 (T9, T17 of FIG. 11). In such manner, the accuracy of control of the rotation speed of the motor 15 is improved as much as possible.

When the instructed rotation direction CW or CCW to the EDU 14 is given as an instruction of the reverse rotation of the motor 15, the rotation controller 20 outputs to the motor drive unit 22, before reflecting the calculation result of the duty value of the PWM signal to the drive output of the motor drive unit 22, an instruction signal to rotate the motor 15 in a reverse direction relative to the actual rotation direction of the motor 15.

When an instruction signal instructing a rotation in the reverse direction is given, the motor drive unit 22 performs a control of the electric current to apply a reverse torque to the motor 15 relative to the actual rotation direction of the motor 15 according to the previous calculation result of the duty ratio of the PWM signal calculated by the IC 26 (Timing t12a to t12 of FIG. 13). In such manner, the responsiveness of performing the reverse rotation of the motor 15 is improved.

Further, when the instructed rotation direction CW or CCW that instructs a reverse rotation against the actual rotation direction of the motor 15 is given, the motor drive unit 22 performs the rotation control of the motor 15 to rotate the motor 15 in the reverse direction, after performing the regeneration control of the motor 15. In such manner, the electric power is returned to the terminal of the battery voltage VB with the regeneration control, thereby collecting the energy as the electric power.

Second Embodiment

Figure 15:
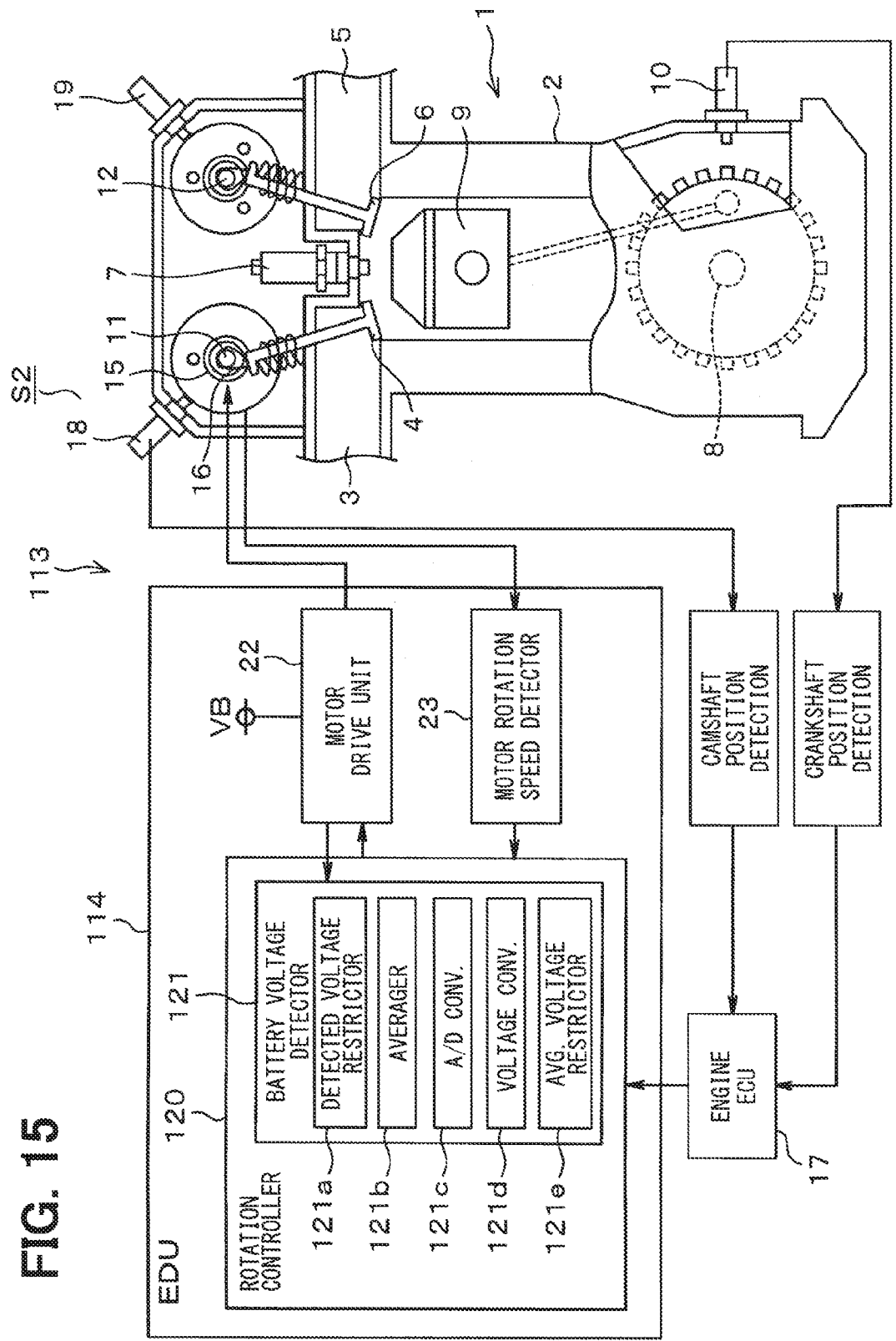
FIG. 15 is a block diagram of the engine system in a second embodiment of the present disclosure.
Figure 16:
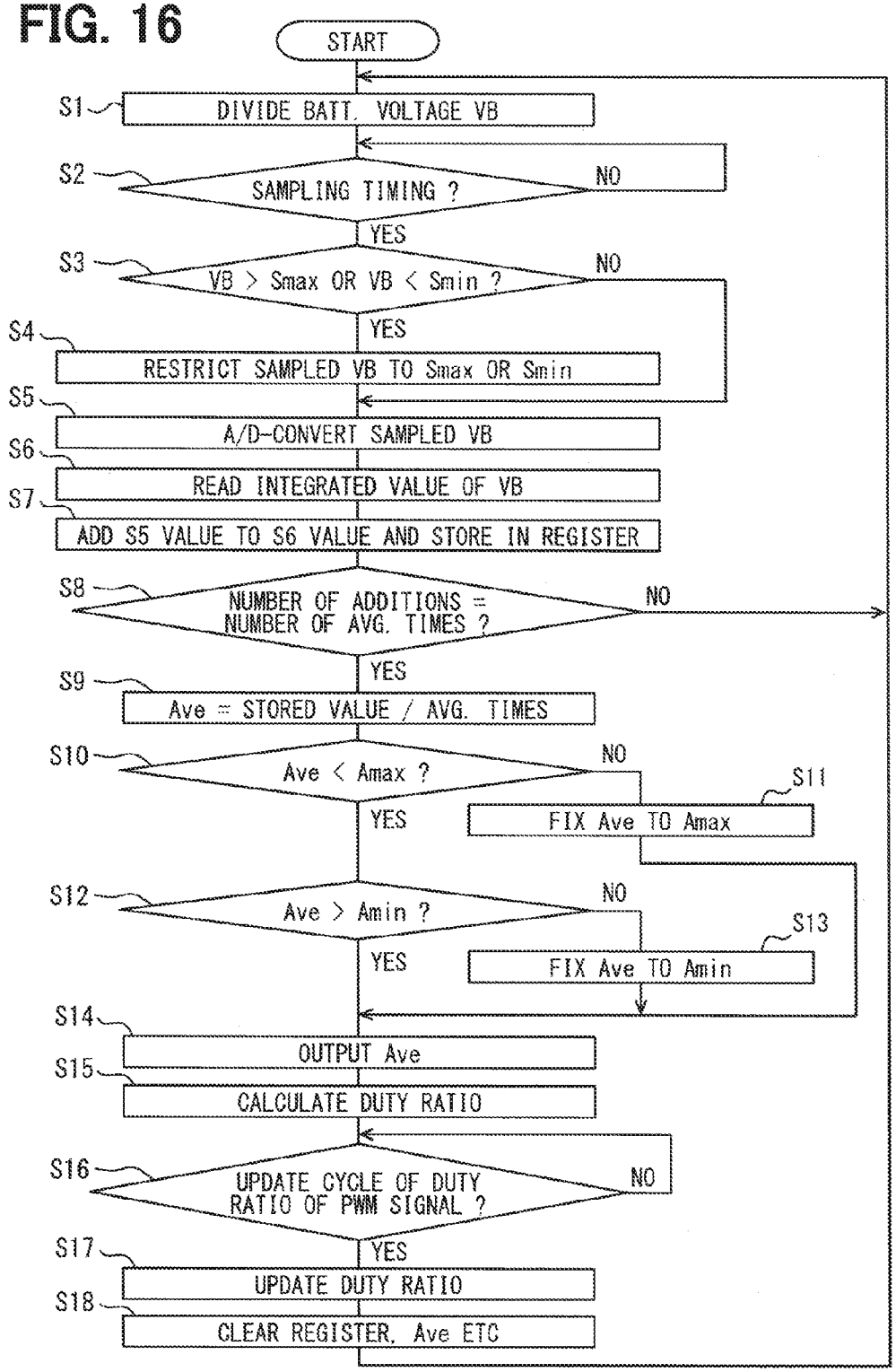
FIG. 16 is a flowchart of a process regarding the process operation contents.
Figure 17:
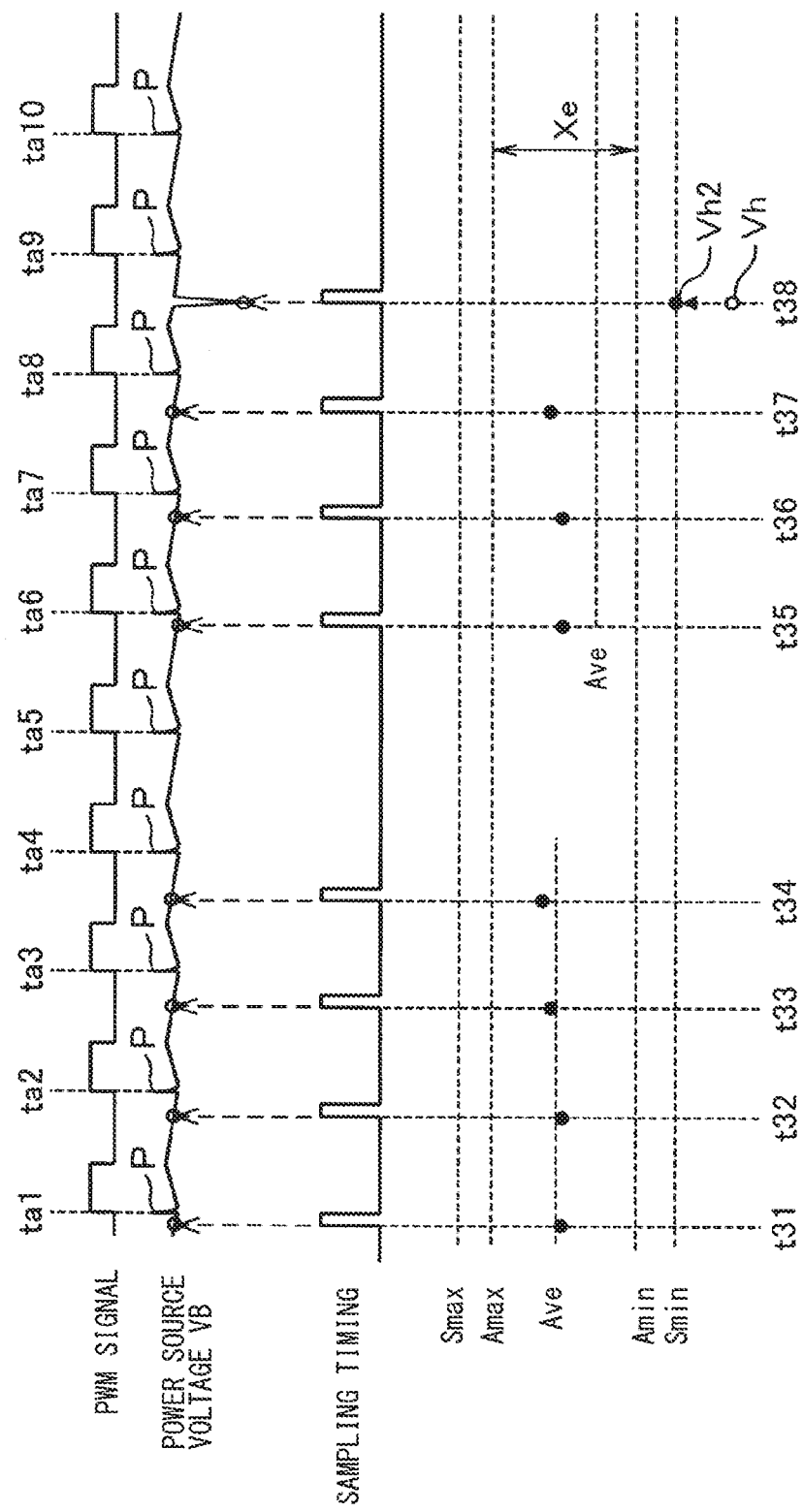
FIG. 17 is a timing chart of the process operation contents.

FIGS. 15 to 17 show other diagrams relevant to the configuration of the second embodiment of the present disclosure.

FIG. 15 is a block diagram of an electric VCT system S2 which replaces FIG. 1. The electric VCT system S2 is provided with a motor driver 113 for the valve timing control. The motor driver 113 for the valve timing control is provided with an EDU 114.

The EDU 114 includes a microcomputer, e.g., the IC 26, and other ICs, together with Random Access Memory (RAM), Read-Only Memory (ROM), and Electrically Eraseable Programmable Read-Only Memory (EEPROM), and provides various functions that serve as a rotation controller 120, which replace the rotation controller 20, the motor drive unit 22, and the motor rotation cycle detector 23.

The rotation controller 120 serves as a controller and a duty ratio corrector. Further, the rotation controller 120 is provided with a battery voltage detector 121. The battery voltage detector 121 primarily functions as a power source voltage detector which detects the battery voltage VB supplied to the motor drive unit 22, and provides other functions as a detected voltage restrictor 121a, a power source voltage averager 121b, an A/D converter 121c, a power source voltage converter 121d, and an averaged voltage restrictor 121e.

The power source voltage converter 121d is provided with a voltage division circuit, and voltage-dividingly converts the battery voltage VB that is input from the motor drive unit 22, and inputs the converted voltage to the detected voltage restrictor 121a.

The power source voltage converter 121d adjusts an input voltage to the A/D converter 121c to be within an allowable input range (e.g., 0 to 5V), which is a range equal to or under a reference voltage.

The detected voltage restrictor 121a is a function block that receives an input of the converted voltage from the power source voltage converter 121d, and restricts an input voltage to the above-mentioned A/D converter 121c to be within an allowable input range between the maximum reference voltage and the minimum reference voltage (e.g., 0 to 5V).

The A/D converter 121c is a function block that samples the battery voltage VB at certain periodic timings, and performs an analog-to-digital conversion to the sampled voltage.

The power source voltage averager 121b is provided with a non-illustrated integration value register, stores consecutively-sampled voltages that are digital-converted by the A/D converter 121c for a preset number of averaging samples (e.g., 4 samples) to the integration value register after adding all of them, and calculates an average value of the sampled voltages by dividing the integration value of 4 samples, for example, by the number of sampled voltages.

The averaged voltage restrictor 121e is a function block that determines whether a power source voltage averaged value Ave averaged by the power source voltage averager 121b is an abnormal value or not.

The averaged voltage restrictor 121e determines whether the power source voltage is an abnormal value or not by checking whether the averaged value Ave is within a preset function guaranteed range. When the value Ave is determined as abnormal, i.e., is not within the preset function guaranteed range, the averaged voltage restrictor 121e fixes the value Ave to a fixed/stationary value of a preset average voltage upper limit value Amax or to a preset average voltage lower limit value Amin.

The rotation controller 120 corrects the duty ratio of the PWM signal according to the power source voltage averaged value Ave that is calculated by the power source voltage averager 121b and is restricted by the averaged voltage restrictor 121e as required, and outputs the corrected duty ratio to the motor drive unit 22.

The motor drive unit 22 drives the motor 15 according to an input of the PWM signal from the rotation controller 120.

The operation of the motor driver 113 according to the above-mentioned configuration is described with reference to FIGS. 16 and 17.

FIG. 16 is a flowchart of an outline of the operation, and FIG. 17 is a flow of the operation outlined by using a timing chart.

As shown in FIG. 16, the battery voltage detector 121 detects the battery voltage VB, and the power source voltage converter 121d performs a voltage division operation of the battery voltage VB in Step S1. Hereafter, the battery voltage VB after such a voltage division operation is designated as the power source voltage. Then, the A/D converter 121c of the battery voltage detector 121 determines whether it is a sampling timing in Step S2.

When it is determined by the rotation controller 120 (i.e., by the battery voltage detector 121) that the sampling timing has arrived, the detected voltage restrictor 121a determines whether the power source voltage exceeds a sample upper limit value Smax, or falls under a sample lower limit value Smin in step S3, and, if the power source voltage is determined as not being within an allowable range from a preset standard voltage, the power source voltage is restricted either to the value Smax or Smin in Step S4.

For example, sampling timings t31 to t38 are shown in FIG. 17. As shown as the sampling timing t38 of FIG. 17, the power source voltage may have an external pulse noise, abruptly overriding thereon. In such a case, a power source voltage Vh at the timing t38 may exceed the sample upper limit value Smax, or may fall under the sample lower limit value Smin.

When exceeding the value Smax or falling under the value Smin, the sample voltage Vh is restricted to the sample upper limit value Smax, or to the sample lower limit value Smin in Step S4. At the timing t38 shown in FIG. 17, the power source voltage Vh is restricted to a voltage Vh2 that is equal to the sample lower limit value Smin.

Then, the A/D converter 121c of the battery voltage detector 121 samples the power source voltage at the sampling timings t31 to t38 (S5 of FIG. 16). The sampling timings t31 to t38 may preferably be different from edge generation timings ta1 to ta10 of the PWM signal.

The reason for avoiding the overlapping of the sampling timing and the edge generation timing is as follows. When the sampling timings t31 to t38 overlap with edge generation timings ta1 to ta10 of the PWM signal as shown in FIG. 17, a pulse noise P that overrides on the power source voltage at the edge generation timings ta1 to ta10 may be sampled. Therefore, the sampling timing and the edge generation timing should intentionally be shifted away from each other.

Then, the battery voltage detector 121 reads the integrated value from the integration value register in Step S6. An initial value of the integration value stored in the integration value register is 0. The battery voltage detector 121 in Step S7 adds the power source voltage to the integration value stored in the integration value register, and stores an after-addition value, i.e., a sum of the integration value and the power source voltage to the integration value register.

Then, the battery voltage detector 121 determines, in Step S8, whether the number of times of addition matches the number of averaging times. When performing this determination process for the first time, since the number of times of addition is 1, it does not match the number of averaging times (e.g., 4 times).

Therefore, the battery voltage detector 121 determines with NO in Step S8, returns the process to Step S1, and repeats the process of Step S3 to S8 when it is determined in Step S2 that an appropriate sampling timing has arrived.

Since the battery voltage detector 121 repeats the process of Step S3 to S8, after a certain number of repetitions, the number of times of addition matches the number of averaging times in Step S8, which leads to a YES determination in Step S8. Then, in Step S9, the power source voltage averager 121b of the battery voltage detector 121 sets the stored value stored in the integration value register to the power source voltage averaged value Ave, after dividing the stored value by the number of averaging times. Thereby, at the timing t34, the power source voltage averaged value Ave is calculated, for example.

Then, in Step S10, the averaged voltage restrictor 121e of the battery voltage detector 121 determines whether the power source voltage averaged value Ave is less than the average voltage upper limit value Amax. When the power source voltage averaged value Ave is equal to or greater than the average voltage upper limit value Amax, the power source voltage averaged value Ave is fixed to a constant value, i.e., to the average voltage upper limit value Amax in Step S11.

On the contrary, the averaged voltage restrictor 121e of the battery voltage detector 121 determines whether the power source voltage averaged value Ave exceeds the average voltage lower limit value Amin in Step S12. When the power source voltage averaged value Ave is equal to or less than average voltage lower limit value Amin, the power source voltage averaged value Ave is fixed to a constant value, i.e., to the average voltage lower limit value Amin in Step S13.

That is, the averaged voltage restrictor 121e determines whether the power source voltage averaged value Ave shown in FIG. 17 is within a range between the average voltage upper limit value Amax and the average voltage lower limit value Amin, and, when it is not within such a range, the restrictor 121e fixes the value Ave to the average voltage upper limit value Amax or to the average voltage lower limit value Amin.

Now, since the average voltage upper limit value Amax is set up as (being) lower than the sample upper limit value Smax and the average voltage lower limit value Amin is set up as (being) greater than the sample lower limit value Smin as shown in FIG. 17, the power source voltage averaged value Ave is adjusted to be within a narrower range Xe, as compared with the sampled voltage of the power source voltage. As a result, in Step S14, the averaged voltage restrictor 121e outputs the power source voltage averaged value Ave that is adjusted to have a value equal to or within a range between the average voltage lower limit value Amin and the average voltage upper limit value Amax.

Then, in Step S15, the rotation controller 120 calculates, i.e., corrects, the duty ratio according to the power source voltage averaged value Ave outputted from the battery voltage detector 121. This process is performed by substituting the term of the correction coefficient $\Delta VB$ of the power source voltage in the equation 1 with a value according to power source voltage average value. For example, when a standard value of the battery voltage VB is defined in advance, the correction coefficient $\Delta VB$ from the following equation 2 may be used to substitute the term in the equation 1.

$$\Delta VB = \text{a standard value/the power source voltage averaged value Ave} \quad \text{(Equation 2)}$$

Since a series of processes performed by the rotation controller 120 are the same as the calculation process of the equation 1 that is performed by the rotation controller 20 of the first embodiment, description is not repeated in the present embodiment.

When the correction coefficient $\Delta VB$ is calculated based on the equation 2, the rotation controller 120 performs the correction of the duty ratio in the following manner. That is, the rotation controller 120 decreases the duty ratio in response to an increase of the power source voltage averaged value Ave, or increases the duty ratio in response to a decrease of the power source voltage averaged value Ave.

This process of correction is performed after the calculation and output of the power source voltage averaged value Ave, and before starting the next averaging process, i.e., before the timing t35. In the example of FIG. 17, it is performed between the timing t34 and the timing t35.

Then, in Step S16, the rotation controller 120 determines whether it is an update timing, i.e., the update cycle, of the duty ratio of the PWM signal, and when it is determined to arrive at the update timing, the duty ratio is updated in Step S17, and the motor 15 is driven. In such manner, regardless of the fluctuation of the power source voltage averaged value Ave, the torque of the motor 15 is controlled to be evenly output as much as possible. Then, the rotation controller 120 clears the various variables, e.g., the number of times of addition, the integration value register, and the power source voltage average value, and the process returns to Step S1.

In the present embodiment, the rotation controller 120 is configured to correct the duty ratio of the PWM signal according to the power source voltage averaged value Ave that is detected by the battery voltage detector 121 and averaged by the power source voltage averager 121b.

As a result, the duty ratio of the PWM signal is adjusted and the torque of the motor 15 is controlled as even as possible regardless of the change/fluctuation of the battery voltage VB. Further, since the duty ratio is corrected according to the power source voltage averaged value Ave that is derived by averaging the sampled voltages, even when an abrupt, external noise overrides the battery voltage VB, a steep change of the duty ratio is prevented, and the torque of the motor 15 is prevented from changing too much, as a result.

Further, the battery voltage detector 121 samples the battery voltage VB at different timings from the edge generation timings of the PWM signal, i.e., at the sampling timings t31 to t38. Therefore, the power source voltage is sampled, without being influenced by the pulse noise P generated at the edge generation timings of the PWM signal.

Further, the battery voltage detector 121 restricts the detected battery voltage VB to the sample upper limit value Smax or to the sample lower limit value Smin, which is predetermined by the detected voltage restrictor 121a. Therefore, the battery voltage VB is controlled to be within a preset allowable range even when an abrupt, external noise overrides. Thus, a steep change of the duty ratio is prevented, and the torque of the motor 15 is prevented from changing too much, as a result.

Further, the battery voltage detector 121 averages the detected battery voltage VB by using the power source voltage averager 121b, and restricts the power source voltage averaged value Ave after the averaging process to the average voltage upper limit value Amax or to the average voltage lower limit value Amin by using the averaged voltage restrictor 121e. Therefore, even when an abrupt, external noise overrides, the battery voltage VB is controlled to be within a preset range, thereby a steep change of the duty ratio is prevented, and the torque of the motor 15 is prevented from changing too much, as a result.

Although, in the present embodiment, the rotation controller 120 is described as correcting the duty ratio of the PWM signal according to the power source voltage averaged value Ave, the correction of the duty ratio may be performed differently. That is, for example, by setting the number of averaging times to 1, the duty ratio of the PWM signal may be corrected every time the battery voltage VB is sampled according to the sampled voltage. Even in such case, the torque of the motor 15 is controlled to be evenly output without regard to the change of the sampled voltage of the battery voltage VB.

Further, even when the number of averaging times is set to 1, the detected voltage restrictor 121a may restrict the sampled voltage either to the sample upper limit value Smax, or to the sample lower limit value Smin. Even in such configuration, the battery voltage VB is controlled to be within a preset range under an abrupt, external pulse noise, thereby a steep change of the duty ratio is prevented.

Other Embodiments

Although the present disclosure has been described in connection with preferred embodiment thereof with reference to the accompanying drawings, it is to be noted that various changes and modifications will become apparent to those skilled in the art.

For example, the equation 1 using the coefficients A, B, C, D may be not only used in an accurate, rigorous control according to the calculation of the equation 1, but may also be used in other controls that take the margins and the offsets into consideration.

Such changes, modifications, and summarized schemes are to be understood as being within the scope of the present disclosure as defined by appended claims.

What is claimed is:

1. A motor driver for a valve timing control of an internal combustion engine, the motor driver comprising:
   a motor drive unit configured to drive a motor for a valve opening control of a valve by controlling a phase of a camshaft in an electric variable cam timing system;
   a motor rotation cycle obtainer configured to obtain an actual rotation cycle of the motor;
   a calculator configured to calculate and to output to the motor drive unit, a duty ratio of a pulse width modulation (PWM) signal for the drive of the motor based on a target rotation cycle of the motor and the actual rotation cycle of the motor obtained by the motor rotation cycle obtainer, when the target rotation cycle is instructed as an instructed rotation cycle; and
   a controller configured to output an instruction signal to the motor drive unit, the instruction signal instructing the motor to rotate in a backward rotation direction or a forward rotation direction, depending on a calculation result of the duty ratio of the PWM signal by the calculator, wherein
   the instruction signal instructs the motor to rotate in the forward rotation direction along an actual rotation direction, when the calculation result takes a positive value as the duty ratio, and
   the instruction signal instructs the motor to rotate in the backward rotation direction reversing the actual rotation direction, when the calculation result of the calculator takes a negative value as the duty ratio, and wherein
   the motor drive unit rotates the motor in the backward rotation direction after performing a regeneration control of the motor, when receiving the instruction signal instructing the backward rotation direction relative to the actual rotation direction.

2. The motor driver of claim 1 further comprising:
   a power source voltage detector configured to detect a power source voltage that is applied to the motor drive unit; and
   a duty ratio corrector configured to correct the duty ratio of the PWM signal according to the detected power source voltage from the power source voltage detector and to control the torque of the motor.

3. The motor driver of claim 2, wherein
the power source voltage detector samples the power source voltage at a sampling timing that is different from an edge generation timing, when an edge of the PWM signal is generated.

4. The motor driver of claim 2 further comprising:
a detected voltage restrictor configured to restrict the detected power source voltage from the power source voltage detector to one of a preset upper limit value and a preset lower limit value, wherein
the duty ratio corrector corrects the duty ratio of the PWM signal according to a restricted value of the detected power source voltage restricted by the detected voltage restrictor.

5. The motor driver of claim 2 further comprising:
a power source voltage averager configured to consecutively sample the power source voltage a preset number of times to store consecutive power source voltage samples and to calculate an average value of the consecutive power source voltage samples, wherein
the duty ratio corrector corrects the duty ratio of the PWM signal according to the average value of the consecutive power source voltage samples.

6. The motor driver of claim 5 further comprising:
an averaged voltage restrictor configured to restrict the average value of the consecutive power source voltage samples to one of a preset upper limit value and a preset lower limit value, wherein
the duty ratio corrector corrects the duty ratio of the PWM signal according to a restricted value of the power source voltage restricted by the averaged voltage restrictor.

7. A motor driver for a valve timing control of an internal combustion engine, the motor driver comprising:
a motor drive unit configured to drive a motor for a valve opening control of a valve by controlling a phase of a camshaft in an electric variable cam timing system;
a calculator configured to calculate a duty ratio of a pulse width modulation (PWM) signal for a drive of the motor, and outputting to output a calculation result to the motor drive unit, upon receiving a rotation direction instruction instructing a rotation direction of the motor;
a motor rotation direction obtainer configured to obtain an actual rotation direction of the motor; and
a controller configured to control a supply of an electric current to rotate the motor by an output of an instruction signal to the motor drive unit, wherein
the controller outputs the instruction signal to the motor drive unit at an output timing before the motor drive unit reflects the calculation result of the duty ratio of the PWM signal to a drive output from the motor drive unit, to instruct the motor drive unit to apply a backward rotation torque relative to the actual rotation direction according to a previous calculation result of the duty ratio of the PWM signal by the calculator, when receiving the rotation direction instruction instructing a backward rotation direction relative to a forward rotation direction along the actual rotation direction that is obtained by the motor rotation direction obtainer.

8. The motor driver of claim 7, wherein
the motor drive unit rotates the motor in the backward rotation direction after performing a regeneration control of the motor, when receiving the instruction signal instructing the backward rotation direction relative to the actual rotation direction.

9. The motor driver of claim 7 further comprising:
a power source voltage detector configured to detect a power source voltage that is applied to the motor drive unit; and
a duty ratio corrector configured to correct the duty ratio of the PWM signal according to the detected power source voltage from the power source voltage detector and to control the torque of the motor.

10. A motor driver for a valve timing control of an internal combustion engine, the motor driver comprising:
a motor drive unit configured to drive a motor for a valve opening control of a valve by controlling a phase of a camshaft in an electric variable cam timing system;
a motor rotation cycle obtainer configured to obtain an actual rotation cycle of the motor;
a calculator configured to calculate and to output to the motor drive unit, a duty ratio of a pulse width modulation (PWM) signal for the drive of the motor based on a target rotation cycle of the motor and the actual rotation cycle of the motor obtained by the motor rotation cycle obtainer, when the target rotation cycle is instructed as an instructed rotation cycle; and
a controller configured to output an instruction signal to the motor drive unit, the instruction signal instructing the motor to rotate in a backward rotation direction or a forward rotation direction, depending on a calculation result of the duty ratio of the PWM signal by the calculator;
a power source voltage detector configured to detect a power source voltage that is applied to the motor drive unit; and
a duty ratio corrector configured to correct the duty ratio of the PWM signal according to the detected power source voltage from the power source voltage detector and controlling the torque of the motor, wherein
the instruction signal instructs the motor to rotate in the forward rotation direction along an actual rotation direction, when the calculation result takes a positive value as the duty ratio, and
the instruction signal instructs the motor to rotate in the backward rotation direction reversing the actual rotation direction, when the calculation result of the calculator takes a negative value as the duty ratio.

11. The motor driver of claim 10, wherein
the motor drive unit rotates the motor in the backward rotation direction after performing a regeneration control of the motor, when receiving the instruction signal instructing the backward rotation direction relative to the actual rotation direction.

12. The motor driver of claim 10, wherein
the power source voltage detector samples the power source voltage at a sampling timing that is different from an edge generation timing, when an edge of the PWM signal is generated.

13. The motor driver of claim 10 further comprising:
a detected voltage restrictor configured to restrict the detected power source voltage from the power source voltage detector to one of a preset upper limit value and a preset lower limit value, wherein
the duty ratio corrector corrects the duty ratio of the PWM signal according to a restricted value of the detected power source voltage restricted by the detected voltage restrictor.

14. The motor driver of claim 10 further comprising:

a power source voltage averager configured to consecutively sample the power source voltage a preset number of times to store consecutive power source voltage samples and to calculate an average value of the consecutive power source voltage samples, wherein the duty ratio corrector corrects the duty ratio of the PWM signal according to the average value of the consecutive power source voltage samples.

15. The motor driver of claim 14 further comprising:

an averaged voltage restrictor configured to restrict the average value of the consecutive power source voltage samples to one of a preset upper limit value and a preset lower limit value, wherein the duty ratio corrector corrects the duty ratio of the PWM signal according to a restricted value of the power source voltage restricted by the averaged voltage restrictor.

\* \* \* \* \*